(12) United States Patent  (10) Patent No.: US 7,533,742 B2
Johnson et al.  (45) Date of Patent: May 19, 2009

(54) BED TRANSFER SYSTEM

(75) Inventors: Daniel T. Johnson, Medina, MN (US);
Paul David Holtan, Savage, MN (US)

(73) Assignee: Dane Industries, Inc., Brooklyn Park, MN (US)

( * ) Notice: Subject to any disclaimer, the term of this patent is extended or adjusted under 35 U.S.C. 154(b) by 362 days.

(21) Appl. No.: 11/254,564

(22) Filed: Oct. 20, 2005

(65) Prior Publication Data

US 2006/0102392 A1    May 18, 2006

Related U.S. Application Data

(63) Continuation-in-part of application No. 11/017,975, filed on Dec. 21, 2004, now Pat. No. 7,219,754, which is a continuation of application No. 10/280,157, filed on Oct. 25, 2002, now Pat. No. 6,871,714, said application No. 11/254,564 is a continuation-in-part of application No. 10/836,593, filed on Apr. 30, 2004.

(60) Provisional application No. 60/621,357, filed on Oct. 22, 2004, provisional application No. 60/336,352, filed on Oct. 26, 2001, provisional application No. 60/467,441, filed on May 3, 2003.

(51) Int. Cl.
*B62D 51/04* (2006.01)
(52) U.S. Cl. ......................... 180/16; 180/19.1
(58) Field of Classification Search .................. 180/11, 180/12, 15, 16, 19.1, 19.2, 19.3, 904; 280/33.992, 280/400, 402; 5/510; 414/495
See application file for complete search history.

(56) References Cited

U.S. PATENT DOCUMENTS 1,050,919 A    1/1913  Conley (Continued)

FOREIGN PATENT DOCUMENTS

AT    340315    12/1977

(Continued)

OTHER PUBLICATIONS

International Search Report, PCT/US2005/038065, Aug. 17, 2007.

(Continued)

*Primary Examiner*—Anne Marie M. Boehler
(74) *Attorney, Agent, or Firm*—Dorsey & Whitney LLP

(57) ABSTRACT

The present invention is a powered hospital bed mover or bed transfer system. The bed mover includes a bed attachment mechanism that is vertically displaceable relative to a base that includes an electrically powered drive wheel and a pair of support castors. The attachment mechanism includes a pair of horizontally oriented jaws with jaw openings that face away from each other. Each jaw includes a contact switch in its bottom surface and a contact switch in its jaw opening. The contact switches indicate to the mover and its user that the mover is properly engaged with the frame of a hospital bed. The jaws are horizontally displaceable and diverge from each other to engage vertical frame members of a hospital bed. A control panel has a joystick adapted to control the speed and direction of travel for the mover. The control panel also has controls for actuating the jaws, changing the elevation of the attachment mechanism, and locking at least one of the support castors. The control panel is hinged to the mover such that it may pivot outwardly away from the mover. A hinged panel also is provided to allow the pivoting of the drive wheel about a vertical pivot axis.

14 Claims, 18 Drawing Sheets

U.S. PATENT DOCUMENTS

| | | |
|---|---|---|
| 2,621,687 A | 12/1952 | William |
| 2,695,179 A | 11/1954 | Fancsali |
| 2,720,992 A | 10/1955 | Cushman |
| 2,790,513 A | 4/1957 | Draxler |
| 2,846,018 A | 8/1958 | Puckett |
| 2,877,911 A | 3/1959 | Arnot |
| 2,904,202 A | 9/1959 | Brady |
| 2,935,161 A | 5/1960 | Comfort |
| 3,127,209 A | 3/1964 | Faust et al. |
| 3,524,512 A | 8/1970 | Voeks et al. |
| 3,575,250 A | 4/1971 | Dykes et al. |
| 3,633,086 A | 1/1972 | Speth et al. |
| 3,791,474 A | 2/1974 | Stammen et al. |
| 3,876,024 A | 4/1975 | Shieman et al. |
| 3,887,095 A | 6/1975 | Suzuki |
| 4,053,025 A | 10/1977 | Slusarenko |
| 4,096,920 A | 6/1978 | Heyn |
| 4,265,337 A | 5/1981 | Dammeyer |
| 4,266,903 A | 5/1981 | Surbrook |
| 4,531,757 A | 7/1985 | Kuhn |
| 4,573,549 A | 3/1986 | Pankow et al. |
| 4,611,948 A | 9/1986 | Johnson |
| 4,634,337 A | 1/1987 | Hamman |
| 4,730,685 A | 3/1988 | Sinkkonen |
| 4,771,840 A | 9/1988 | Keller |
| 4,793,763 A | 12/1988 | Bubik |
| 4,878,050 A | 10/1989 | Kelley |
| 4,942,529 A | 7/1990 | Avitan et al. |
| 4,964,837 A | 10/1990 | Collier |
| 5,011,169 A | 4/1991 | Henderson et al. |
| 5,048,626 A | 9/1991 | Stehler et al. |
| 5,064,012 A | 11/1991 | Losego |
| 5,082,074 A | 1/1992 | Fischer |
| 5,096,358 A | 3/1992 | Plant et al. |
| 5,161,634 A | 11/1992 | Ichihara et al. |
| 5,167,389 A | 12/1992 | Reimers |
| 5,322,306 A | 6/1994 | Coleman |
| 5,340,202 A | 8/1994 | Day |
| 5,388,176 A | 2/1995 | Dykstra et al. |
| 5,439,069 A | 8/1995 | Beeler |
| 5,483,615 A | 1/1996 | Hallidy |
| 5,518,260 A | 5/1996 | Grignon |
| 5,573,078 A | 11/1996 | Stringer et al. |
| 5,580,207 A | 12/1996 | Kiebooms et al. |
| 5,592,355 A | 1/1997 | Ikkai et al. |
| 5,633,544 A | 5/1997 | Toida et al. |
| 5,743,347 A | 4/1998 | Gingerich |
| 5,762,155 A | 6/1998 | Scheulderman |
| 5,769,051 A | 6/1998 | Bayron et al. |
| 5,783,989 A | 7/1998 | Issa et al. |
| 5,791,669 A | 8/1998 | Broddon et al. |
| 5,808,376 A | 9/1998 | Gordon et al. |
| 5,860,485 A | 1/1999 | Ebbenga |
| 5,880,652 A | 3/1999 | Snel |
| 5,934,694 A | 8/1999 | Schugt et al. |
| 5,947,490 A | 9/1999 | Munnoch et al. |
| 5,964,313 A | 10/1999 | Guy |
| 5,983,614 A | 11/1999 | Hancock et al. |
| 5,984,333 A | 11/1999 | Constantijn et al. |
| 6,060,859 A | 5/2000 | Jonokuchi et al. |
| 6,070,679 A | 6/2000 | Berg et al. |
| 6,109,379 A | 8/2000 | Madwed |
| 6,144,125 A | 11/2000 | Birkestrand et al. |
| 6,168,367 B1 | 1/2001 | Robinson |
| 6,220,379 B1 | 4/2001 | Schugt et al. |
| 6,244,366 B1 | 6/2001 | Otterson et al. |
| 6,260,643 B1 | 7/2001 | Schuchardt |
| 6,352,130 B2 * | 3/2002 | Klein et al. ............... 180/19.3 |
| 6,378,642 B1 | 4/2002 | Sutton |
| 6,406,250 B2 | 6/2002 | Jaeger et al. |
| 6,435,803 B1 | 8/2002 | Robinson |
| 6,481,514 B2 | 11/2002 | Takada |
| D475,645 S | 6/2003 | Hoonsbeen |
| 6,681,877 B2 | 1/2004 | Ono et al. |
| 6,729,421 B1 | 5/2004 | Gluck et al. |
| 6,871,714 B2 | 3/2005 | Johnson |
| 6,880,652 B2 | 4/2005 | Holtan et al. |
| 7,134,515 B2 | 11/2006 | Lenkman |
| 2003/0231945 A1 | 12/2003 | Weatherly |
| 2004/0134692 A1 | 7/2004 | Kime et al. |
| 2004/0256166 A1 | 12/2004 | Holtan et al. |
| 2005/0098362 A1 | 5/2005 | Johnson |
| 2005/0098364 A1 | 5/2005 | Johnson et al. |
| 2005/0116431 A1 | 6/2005 | Holtan et al. |
| 2006/0000664 A1 | 1/2006 | Huang et al. |
| 2006/0197295 A1 | 9/2006 | Holtan et al. |
| 2006/0243500 A1 | 11/2006 | Wiff et al. |
| 2007/0013157 A1 | 1/2007 | Wiff et al. |
| 2007/0145707 A1 | 6/2007 | Johnson |
| 2007/0181352 A1 | 8/2007 | Holtan et al. |
| 2007/0289787 A1 | 12/2007 | Wiff et al. |

FOREIGN PATENT DOCUMENTS

| | | | |
|---|---|---|---|
| BE | 1012207 | | 7/2000 |
| EP | 0326754 | * | 8/1989 |
| EP | 0405230 | | 1/1991 |
| EP | 1454787 | | 9/2004 |
| FR | 2246415 | | 5/1975 |
| FR | 2587291 | | 9/1985 |
| GB | 1601930 | | 11/1981 |
| GB | 2332405 | | 6/1999 |
| GB | 2342327 | | 4/2000 |
| NL | 1016924 | | 6/2002 |
| WO | WO88/06385 | | 9/1988 |
| WO | WO96/03305 | | 2/1996 |
| WO | WO0185086 | | 11/2001 |

OTHER PUBLICATIONS

Declaration of David Leckey, Executive Vice President of Dane Technologies, Inc., attaching photos showing a motorized Quickart 2000 shopping cart mover with a hitch that allows the Quickart 2000 to move two side-by-side lines of shopping carts, labeled "Exhibit A", "Exhibit B" and "Exhibit C", 4 pages, at least as early as Oct. 27, 2003.

Declaration of William A. Grimes, Senior Vice President of Dane Industries, Inc., attaching photos showing a motorized shopping cart mover and hitch, labeled "Exhibit E" and "Exhibit F", and showing a motorized shopping cart mover employing a second type of hitch for attaching to a shopping cart, labeled "Exhibit G", "Exhibit H" and "Exhibit I", 6 pages, at least as early as Autumn 2004.

Declaration of William A. Grimes, Senior Vice President of Retail Sales of Dane Industries, Inc., attaching photos showing a motorized shopping cart mover with a hitch that is configured to attach to a shopping cart, labeled "Exhibit O", "Exhibit P" and "Exhibit Q", 4 pages, at least as early as 2001.

Declaration of William A. Grimes, Senior Vice President of Retail Sales of Dane Industries, Inc., attaching photos showing a hitch of a motorized shopping cart mover that is configured to enter the rear of a shopping cart, labeled "Exhibit U", "Exhibit V" and "Exhibit V", 4 pages, at least as early as Aug. 31, 2004.

Declaration of James W. Wiff, Vice President, Engineering and Product Development of Dane Industries, Inc., attaching photos showing a collapsible pallet, labeled "Exhibit AA" and "Exhibit BB", at least as early as May 21, 2004.

Declaration of Paul D. Holtan, Senior Staff Engineer at Dane Industries, Inc., attaching photos showing a hitch for attachment to a motorized shopping cart mover, labeled "Exhibit X", "Exhibit XI", "Exhibit XII", "Exhibit XIII", "Exhibit XIV", "Exhibit XV", "Exhibit XVI", "Exhibit XVII" and "Exhibit XVII", at least as early as Jan. 1, 2002.

Dane Industries, Brochure "Productivity Solutions from the Industry Leader", 2 pages, 2001.

Dane Industries Product Brochure for QuicKART 1000 Power Pal, 2 pages, 2001.
Dane Industries Product Brochure for QuicKART 2000, 2 pages, 2001.
Dane Industries Product Brochure for PowerPal 3000, 2 pages, 2001.
Dane Industries Product Brochure for QuicKART 5000, 2 pages, 2001.
Declaration of James W. Wiff, Vice President, Engineering and Product Development of Dane Industries, Inc., attaching colored photos showing vaious hitches observed at the United States Postal Service facility, labeled "Exhibit J", "Exhibit K", "Exhibit L", "Exhibit M" and "Exhibit N", 6 pages, at least as early as the period between Oct. 6, 2004 and Oct. 20, 2004.

Declaration of David A. Leckey, Executive Vice President of Dane Industries, Inc., attaching colored photos showing a hitch of a motorized shopping cart mover that is configured to receive the rear wheels of a shopping cart, labeled "Exhibit R", "Exhibit S" and "Exhibit T", 4 pages, at least as early as Aug. 4, 2003.
Declaration of William A. Grimes, Senior Vice President of Dane Industries, Inc., attaching a colored photo showing a hitch of a motorized shopping cart mover that is configured to receive the rear wheels of a shopping cart, labeled "Exhibit X", 2 pages, at least as early as Jan. 13, 2003.

* cited by examiner

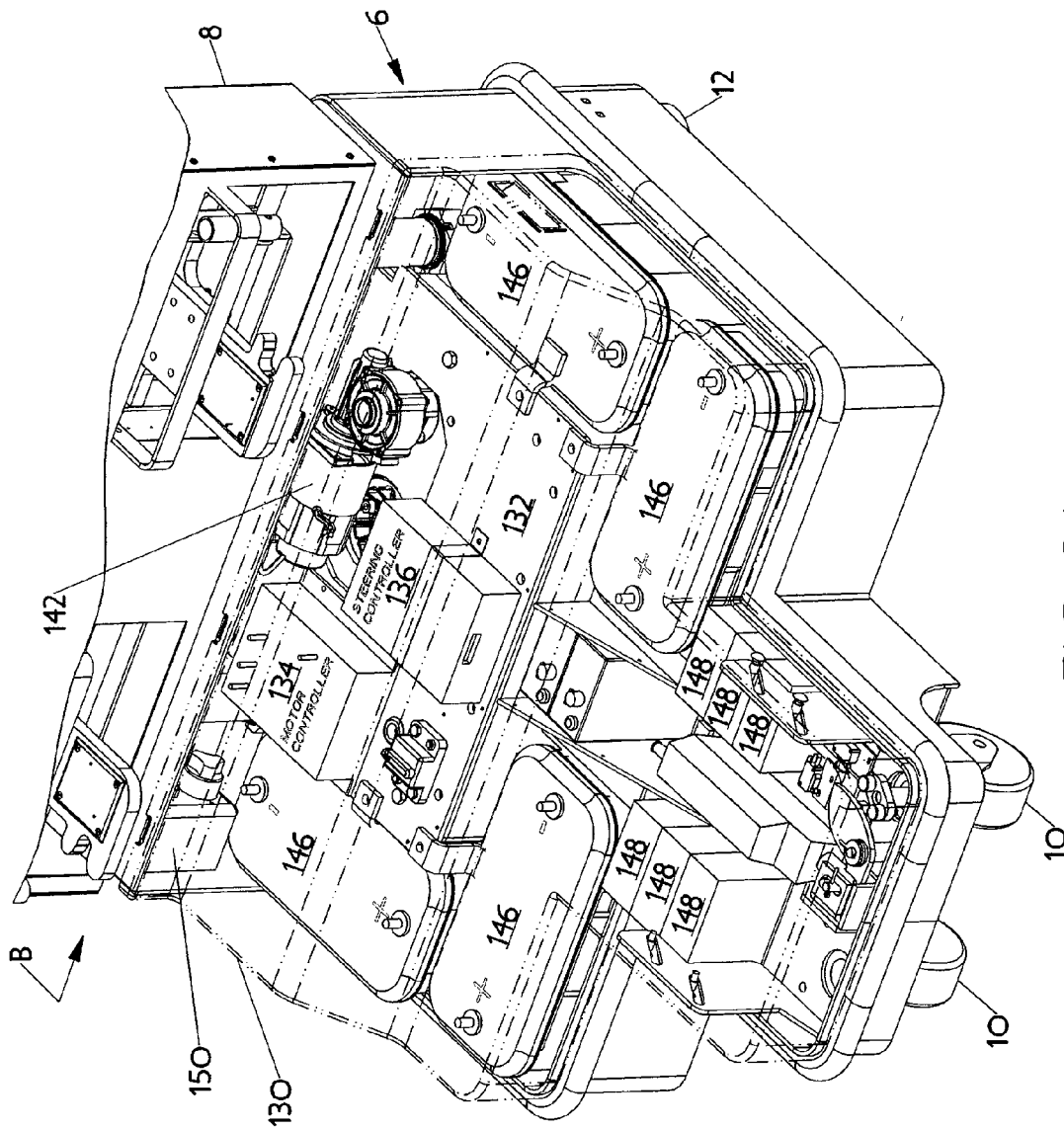
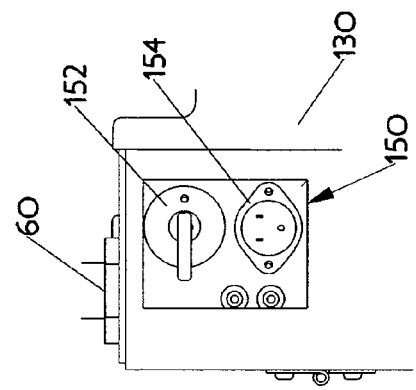
FIG. 9A
FIG. 9B

BED TRANSFER SYSTEM

CROSS-REFERENCE TO RELATED APPLICATIONS

The present application claims priority to U.S. Provisional Patent Application 60/621,357, which was filed Oct. 22, 2004. Also, the present application claims priority to, and is a continuation-in-part ("CIP") of, U.S. patent application Ser. No. 11/017,975, which was filed Dec. 21, 2004 and is a continuation of U.S. patent application Ser. No. 10/280,157, which was filed Oct. 25, 2002 and issued Mar. 29, 2005 as U.S. Pat. No. 6,871,714, which claims priority to U.S. Provisional Patent Application 60/336,352, which was filed on Oct. 26, 2001. The present application also claims priority to, and is a continuation-in-part ("CIP") of, U.S. patent application Ser. No. 10/836,593, which was filed Apr. 30, 2004 and claims priority to U.S. Provisional Patent Application 60/467,441, which was filed May 3, 2003. All of the aforementioned patent applications are hereby incorporated by reference in their entireties into the present application.

FIELD OF THE INVENTION

The present invention relates to devices for, and methods of, transferring medical equipment. More specifically, the present invention relates to devices for, and methods of, transferring hospital beds.

BACKGROUND OF THE INVENTION

Currently, most hospital beds, specialized treatment beds, and patient transfer beds (hereinafter, "hospital beds") are moved manually by people. Hospital beds are regularly moved while the patient still occupies the bed. This is because less physical effort is required to move the patient and bed together than to lift the patient off the bed, place the patient onto a gurney bed, move the patient and gurney bed to another room, and then lift the patient back into a bed. Due to the weight of the typical hospital bed, the force required to move the bed through long corridors, up or down ramps, or over carpet requires force that exceeds a safe workload. As a result, a significant number of injuries occur each year to people who move hospital beds. A typical hospital beds weighs between 400 and 2000 pounds, depending on the style of bed and the weight of the patient in the bed.

Under the current procedure for moving hospital beds, a person pushes on the edge of the bed mattress or on handles that are located on the headboard or footboard of the bed, all of which are above waist height (approximately four feet above ground level). This pushing requires the person to use the legs, hips, back, arms, and hands, any one of which is susceptible to injury from over exertion. These injuries cause lost work time and long-term health problems for people who move hospital beds, and they cause added expenses to the hospitals. And lastly, the people that must move the beds are often nurses, and moving hospital beds contributes to the already high rate of nurse workplace injuries and is typically not a task the nurses enjoy.

In an attempt to address the problems associated with moving hospital beds, Applicants developed the powered bed mover disclosed in U.S. patent application Ser. No. 10/280,157, which is entitled Hospital Bed Power-Assist and was filed Oct. 25, 2002. Said application is hereby incorporated by reference in its entirety into the present application.

While the bed mover of the incorporated application is highly useful, there is a need in the art for a bed mover offering an improved configuration and improved operational features. There is also a need in the art for a method of moving a hospital bed that offers greater efficiency and ease of implementation.

BRIEF SUMMARY OF THE INVENTION

The present invention, in one embodiment, is a bed transfer system comprising a base portion, an attachment portion, an elevator mechanism, a motor controller and a steering controller. In one embodiment, the base portion comprises a wheel assembly, a steering assembly, a support castor, a locking mechanism, a hinged panel and a power supply. The wheel assembly is pivotally coupled about a first vertical axis to the base portion and includes a drive wheel and a first electric motor mounted in a hub of the drive wheel. The steering assembly includes a second electric motor and a mechanical arrangement for causing the wheel assembly to pivot about the first vertical axis. The support castor is pivotally coupled about a second vertical axis to the base portion. The locking mechanism is adapted to engage the support castor to prevent the support castor from pivoting about the second vertical axis. The hinged panel pivots outwardly from the base portion to facilitate pivoting of the wheel assembly about the first vertical axis. The power supply provides power to the first and second motors.

In one embodiment, the attachment portion is adjustably coupled to, and located above, the base portion and comprises a control panel, an attachment mechanism, and an emergency release. The control panel is pivotally coupled to the attachment portion via a hinge. In one embodiment, the control panel includes a joystick adapted to control the travel direction and velocity of the mover, an emergency shut-off, and controls for actuating the attachment mechanism.

In one embodiment, the attachment mechanism includes a pair of horizontally oriented jaws that are horizontally slidably displaceable via a first actuator along horizontal bars attached to the attachment portion. Each jaw has an opening and the openings are oriented away from each other. A pin leading to a first contact switch extends from each jaw into each jaw's opening. A sphere leading to a second contact switch emanates from a bottom surface of each jaw. The jaws diverge horizontally from each other when engaging a vertical frame member of a bed. In one embodiment, the emergency release includes a lever arm adapted to disengage a first end of the first actuator from the attachment portion and cause the jaws to disengage from the frame member of the bed.

In one embodiment, the elevator mechanism is adapted to change the elevation of the attachment portion relative to the base portion. The elevator mechanism comprises a pair of vertical bars that are attached at upper ends to the attachment portion and vertically slidably displaceable via a second actuator within bushings mounted in the base portion.

In one embodiment, the motor controller is in electrical communication with the joystick and the first electric motor. When the joystick is displaced, the motor controller causes the first electric motor to drive the drive wheel.

In one embodiment, the steering controller is in electrical communication with the joystick and the second electric motor. When the joystick is displaced, the steering controller causes the second electric motor to pivot the wheel assembly about the first vertical axis.

The present invention, in one embodiment, is a machine for moving a bed. The machine comprises a bed engagement portion and a base portion. The base portion supports the bed engagement portion and comprises a drive wheel, a support wheel, and a locking mechanism. The support wheel is pivotal about a vertical axis. The locking mechanism actuates between a locked position that prevents the support wheel from pivotally displacing about the vertical axis and an unlocked position that allows the support wheel to pivotally displace about the vertical axis.

In one embodiment, the machine further comprises a contact switch adapted to indicate engagement with the bed. The contact switch is part of the bed engagement portion. Actuation of the contact switch results in the locking mechanism actuating to the unlocked position.

The present invention, in one embodiment, is a machine for moving a bed. The machine comprises a bed engagement portion, a base portion, an electrical power source, and an emergency release. The base portion supports the bed engagement portion and comprises a drive wheel. The electrical power source is adapted to cause the bed engagement portion to engage or disengage the bed. The emergency release is adapted to disengage the bed engagement portion from the bed when the electrical power source is unable to disengage the bed engagement portion from the bed.

In one embodiment, the bed engagement portion comprises means for engaging the bed and the emergency release disengages said means from the bed. In one embodiment, the bed engagement portion comprises one or more jaws horizontally displaced to engage a frame portion of the bed. The emergency release horizontally disengages the one or more jaws from the frame portion of the bed.

The present invention, in one embodiment, is a machine for moving a bed. The machine comprises a bed engagement portion, a base portion and a first contact switch. The base portion supports the bed engagement portion and comprises a drive wheel. The first contact switch is adapted to indicate engagement of the bed engagement portion with the bed.

In one embodiment, the bed engagement portion comprises means for engaging the bed. In one embodiment, the bed engagement portion comprises one or more jaws horizontally displaced to engage a frame portion of the bed. In one embodiment, the first contact switch is supported off the bed engagement portion. In one embodiment, the machine further comprises a second contact switch adapted to indicate proper elevation of the bed engagement portion relative to the bed.

The present invention, in one embodiment, is a machine for moving a bed. The machine comprises a bed engagement portion and a base portion. The base portion supports the bed engagement portion and comprises a drive wheel assembly and a housing. The drive wheel assembly is pivotal about a vertical axis and generally resides within the housing. The housing includes a hinged portion that is caused to pivot when encountered by a portion of the drive wheel assembly when the drive wheel assembly is pivotally displaced about the vertical axis. A footprint area of the base portion is smaller when the drive wheel assembly does not contact the hinged portion than when the drive wheel assembly does contact the hinged portion.

The present invention, in one embodiment, is a machine for moving a bed. The machine comprises a bed engagement portion, a base portion, a housing portion and a control panel. The base portion supports the bed engagement portion and comprises a drive wheel. The control panel comprises at least one control mounted on the control panel. The control panel is pivotal relative to the housing.

In one embodiment, the control panel is pivotal between an up position and a down position. The footprint area of the machine is smaller when the control panel is in the up position. In one embodiment, at least one control is a direction control.

The present invention, in one embodiment, is a machine for moving a bed. The machine comprises a base, an attachment assembly and an elevator. The base comprises a wheel assembly and a steering assembly. The wheel assembly is pivotally coupled about a vertical axis to the base portion and comprises a drive wheel and a first electric motor for causing the drive wheel to pivot about a horizontal axis. The steering assembly comprises a second electric motor and a mechanical arrangement for causing the wheel assembly to pivot about the vertical axis. The attachment assembly is adjustably coupled to, and located above, the base and comprises a bed attachment mechanism. The elevator mechanism is adapted to change the elevation of the attachment assembly relative to the base.

In one embodiment, the attachment assembly further comprises a control panel. In one embodiment, the first electric motor is mounted in a hub of the drive wheel. In one embodiment the attachment mechanism comprises a horizontally oriented jaw that is horizontally displaceable to engage a framework of the bed. The jaw comprises an opening and a contact switch having a member that extends from the jaw. In one embodiment, the member is depressed by the framework of the bed when the jaw engages the framework, thereby actuating the contact switch to indicate that the jaw has engaged the framework. In one embodiment, the member encounters a portion of the bed, thereby actuating the contact switch to indicate that the jaw is properly vertically positioned.

The present invention, in one embodiment, is a device for assisting an operator in moving a hospital bed having at least one bed wheel. The device comprises a body, a motor driven wheel, a handle, and a hitch. The motor driven wheel is pivotably coupled to the body about a vertical axis. The handle pivotably is coupled to the body, such that when the operator pivots the handle, the motor driven wheel pivots about the vertical axis. The hitch is coupled to the body and includes a bed wheel engagement feature.

In one embodiment, the bed wheel engagement feature comprises a pair of sides and the bed wheel is received between said sides when the bed wheel is engaged by the bed wheel engagement feature. In one embodiment, the bed wheel engagement feature further comprises a back extending between said sides. In one embodiment, the bed wheel engagement feature further comprises a wheel entry end opposite said back and extending between said sides. In one embodiment, the wheel entry end is generally open for allowing the bed wheel to enter the bed wheel engagement feature. In one embodiment, the bed wheel engagement feature further comprises a structure adapted to inhibit the bed wheel from rolling out of the wheel entry end. In one embodiment, the bed wheel engagement feature further comprises a curved portion positioned between said sides and adapted to contact at least a portion of the bed wheel's rolling surface. In one embodiment, the hitch is vertically displaceable relative to the body.

The present invention, in one embodiment, a device for assisting an operator in moving a hospital bed wherein the device is hitchable to the hospital bed. The device comprises a body, a motor driven wheel, a handle, and an arm. The motor driven wheel is pivotably coupled to the body. The motor driven wheel is pivotable about a vertical axis. The handle is pivotably coupled to the body, such that when the operator pivots the handle, the motor driven wheel pivots about the vertical axis. The arm extends from the body and includes a wheel near the free end of said arm. In one embodiment, the arm is moveable relative to the body.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 9A is a perspective view of the base portion with its upper housing shown in phantom lines to reveal various components of the mover that are housed within the base portion.

FIG. 9B is side elevation of an electrical box as viewed from arrow B in FIG. 9A.

DETAILED DESCRIPTION OF THE INVENTION a. First Embodiment of the Hospital Bed Transfer System The present invention, in a first embodiment, is a hospital bed transfer system 2 or powered hospital bed mover for transferring a hospital bed 4 from one location to another in a medical facility. As shown in FIG. 1, which is a side elevation of the first embodiment of the bed mover 2 engaged with a hospital bed 4, the bed mover 2 includes a base portion 6 and an attachment portion 8 extending upward from the base portion 6.

As illustrated in FIG. 1, the base portion 6 includes a pair of support castors 10 near the frontmost part of the base portion 6, a pair of stabilization castors 12 near the rearmost part of the base portion 6, and a drive wheel 14 located near the rearward part of the base portion 6. The drive wheel 14 and the support castors 10 support the mover 2 off of a travel surface 16 such as a medical facility floor. The drive wheel 14 also powers the mover 2 along the travel surface 16. As indicated in FIG. 1, the stabilization castors 12 extend from the bottom of the base portion 6 but generally do not touch the travel surface 16 unless the mover 2 begins to tip one direction or the other.

As shown in FIG. 1, the attachment portion 8 includes an attachment mechanism 18 for engaging the frame 20 of the hospital bed 4 and a control panel 22 for controlling the mover 2. As indicated in FIG. 1, in one embodiment, when the mover 2 is engaged with a hospital bed 4 via the attachment mechanism 18, the attachment portion 8 is proximate and generally parallel to the end of the bed frame 20, and the base portion 6 extends generally underneath the bed frame 20 such that the frontmost part of the base portion 6 extends between the castors 21 of the bed frame 20.

As shown in FIG. 2, which is a perspective view of the bed attachment side (i.e., front side) of the bed mover 2, the base portion's generally T-shaped configuration, as viewed from above, makes it possible for the frontmost part of the base portion 6 to fit between the bed castors 21. As illustrated in FIG. 2, in one embodiment, the support castors 10 are located near the front outside corners of the narrow part of the base portion 6, and the stabilization castors 12 are located near the outside rear corners of the widest part of the base portion 6.

As illustrated in FIG. 2 and FIG. 3, which is a perspective view of the operator side (i.e., rear side) of the bed mover 2, the base portion 6 includes a bumper strip 24 that extends generally uninterrupted around the sides of the base portion 6. In one embodiment, the bumper strip 24 is a resilient rubber or polymer material. The bumper strip 24 helps to protect the mover 2, the hospital bed 4 and medical facility walls and corners from damage that might otherwise result from a collision between the mover 2 and such other structures.

As illustrated in FIG. 2, in one embodiment, the attachment mechanism 18 includes a pair of jaws 26 that extend forwardly from the front of the attachment portion 8. As shown in FIG. 2, in one embodiment, the jaws 26 are horizontally oriented and open outwardly in opposite directions. In other embodiments, the jaws 26 open towards each other. In other embodiments, the jaws 26 open in the same direction. In one embodiment, the jaws 26 horizontally converge in order to engage the bed frame 20. In one embodiment, as shown in FIG. 2, the jaws 26 horizontally diverge in order to engage the bed frame 20. In one embodiment, the jaws 26 horizontally displace in the same direction to engage the bed frame 20.

As shown in FIGS. 2 and 3, an emergency bed release lever 25 is provided to allow the manual disengagement of the jaws 26 from the bed frame 20 should the mover 2 become de-energized or inoperable while the jaws 26 are engaged with the bed frame 20. Also, as shown in FIGS. 2 and 3, a handle 27 is located near each upper corner of the attachment portion 8. The handles 27 are provide to allow a user to manually manipulate the mover 2 when the mover 2 is de-energized or inoperable.

As indicated in FIG. 2 and more clearly shown in FIG. 4, which is an elevation of the rear of the attachment portion 8 with the housing partially cut away to disclose features of the attachment mechanism 18, each jaw 26 is mounted on a box 28 that is horizontally, slidably displaceable along a pair of horizontal fixed rods 30 via bushings 32. As shown in FIG. 2, each jaw 26 is fixedly connected to the front of its respective box 28 and, as shown in FIG. 4, the back of each box 28 is pivotally connected to a jaw actuation mechanism that causes the jaws 26 to diverge or converge when engaging or disengaging the bed frame 20.

As shown in FIG. 4, the emergency bed release lever 25 extends down into the attachment portion 8 and is pivotally connected at its bottom end to the frame of the attachment portion 8 via a pivot pin 29. A linkage 31 (shown in hidden lines) is pivotally connected at a first end to the bottom end of the emergency bed release lever 25 via another pivot pin 33. The bottom end of the emergency bed release lever 25 includes a notch 35.

Figure 4:
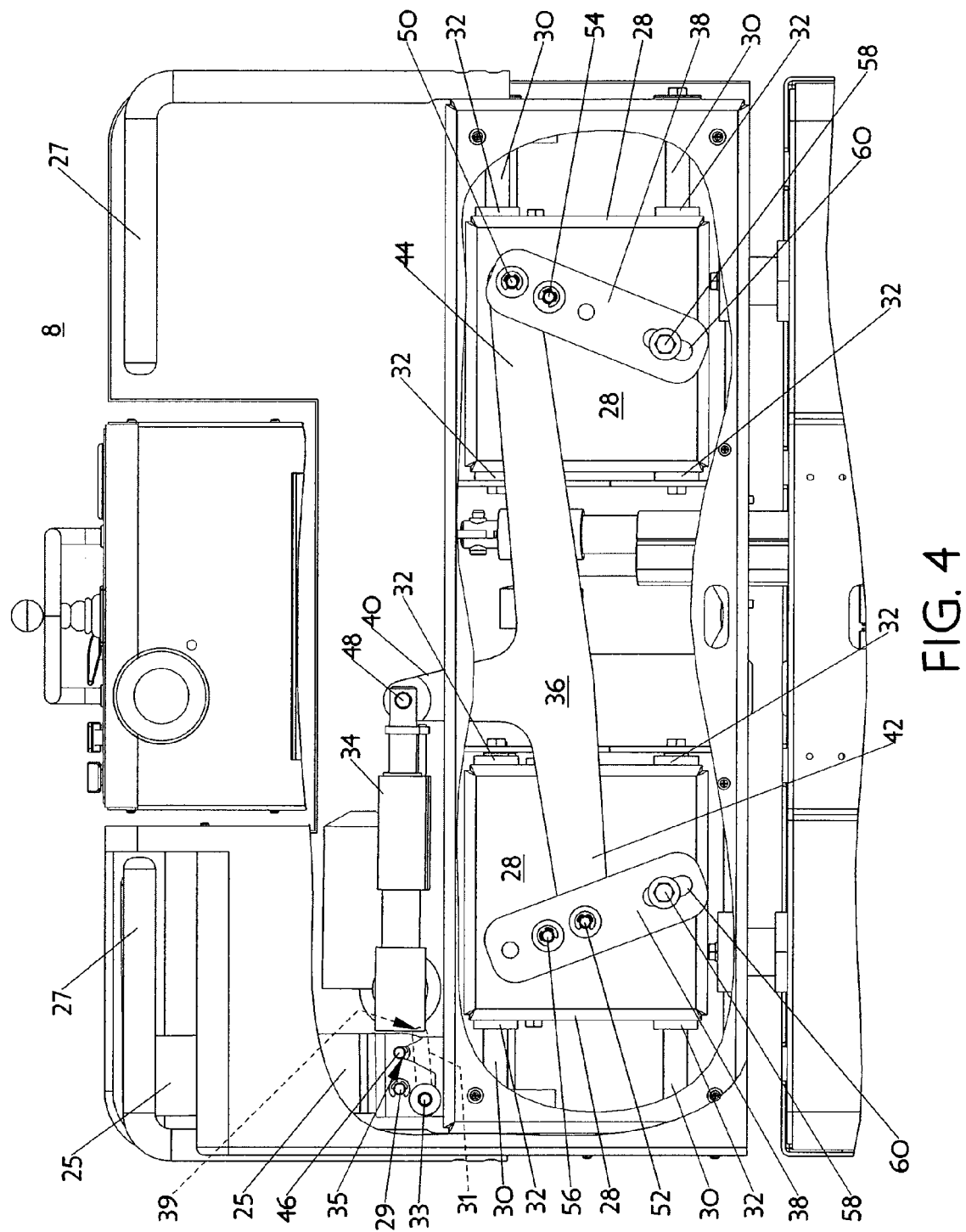
FIG. 4 is an elevation of the rear of the attachment portion with the housing partially cut away to disclose features of the attachment mechanism.

As indicated in FIG. 4, in one embodiment, the jaw actuation mechanism includes an actuator 34, a lever arm 36 and a pair of links 38. In one embodiment, the lever arm 36 forms an inverted T-shape having an upper center arm 40, a left arm 42 and a right arm 44. A first end of the actuator 34 is secured to the frame of the attachment portion 8 via a first pin 46 received within the notch 35 of the emergency bed release handle 25, and a second end of the actuator 34 is pivotally secured via a second pin 48 to the uppermost portion of the upper center arm 40. The rightmost portion of the right arm 44 is pivotally secured to the uppermost portion of the right linkage 38 via a third pin 50, and the leftmost portion of the left arm 42 is pivotally secured to a middle portion of the left linkage 38 via a fourth pin 52.

As shown in FIG. 4, a middle potion of the right linkage 38 is pivotally secured to the frame of the attachment portion 8 via a fifth pin 54, and an upper portion of the left linkage 38 is pivotally secured to the frame of the attachment portion 8 via a sixth pin 56. Also, the lowermost portion of each linkage 38 is pivotally connected to its respective box 28 via bolts 58 pivotally received within slots 60 in the linkages 38.

In view of the described linkage arrangement, in one embodiment as indicated in FIG. 4, when the actuator 34 extends such that the second pin 48 extends away from actuator 34 (i.e., from left to right as viewed in FIG. 4), the left linkage 38 pivots counter clockwise about the fourth pin 52 and the right linkage 38 pivots clockwise about the fifth pin 54. Thus, as can be understood from FIGS. 2-4, the boxes 28 would converge towards each other along their respective horizontal rods 30. In other words, the jaws 26 would converge towards each other. Conversely, when the actuator 34 retracts such that the second pin 48 moves towards the actuator 34 (i.e., from right to left as viewed in FIG. 4), the left linkage 38 pivots clockwise about the fourth pin 52 and the right linkage 38 pivots counter clockwise about the fifth pin 54. Thus, as can be understood from FIGS. 2-4, the boxes 28 would diverge away from each other along their respective horizontal rods 30. In other words, the jaws 26 would diverge away from each other.

Figure 1:
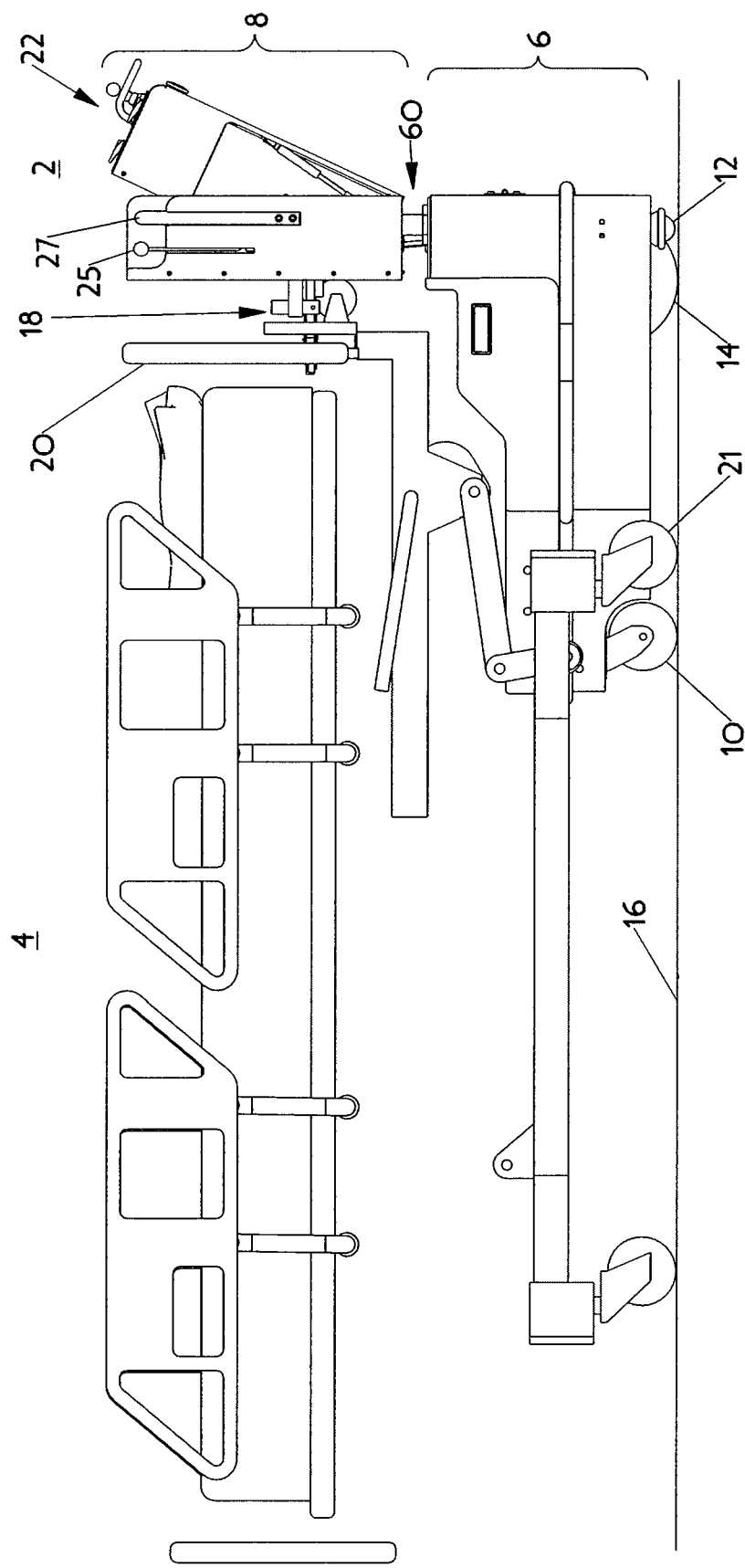
FIG. 1 is a side elevation of a first embodiment of the bed mover engaged with a hospital bed.
Figure 2:
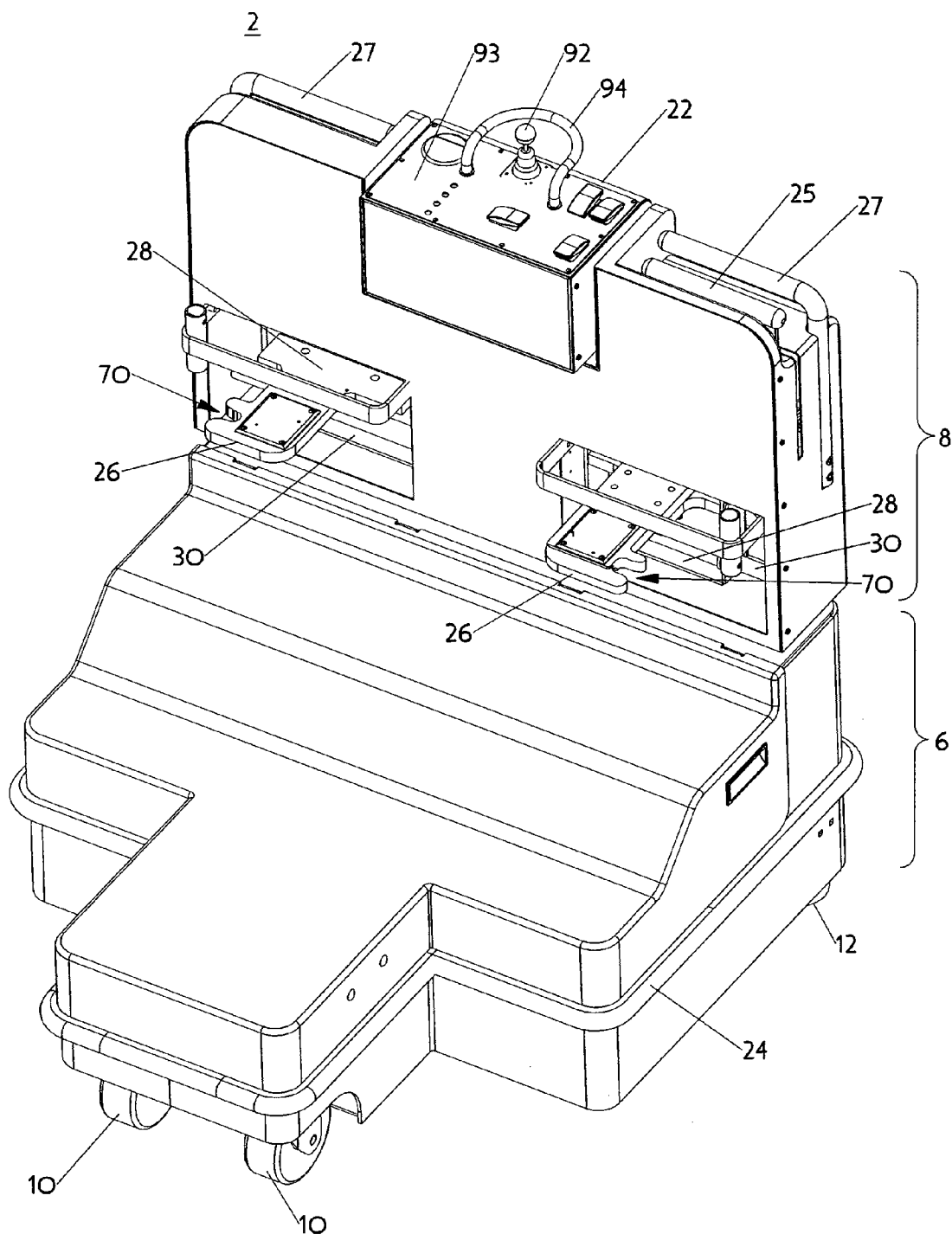
FIG. 2 is a perspective view of the bed attachment side (i.e., front side) of the bed mover.
Figure 3:
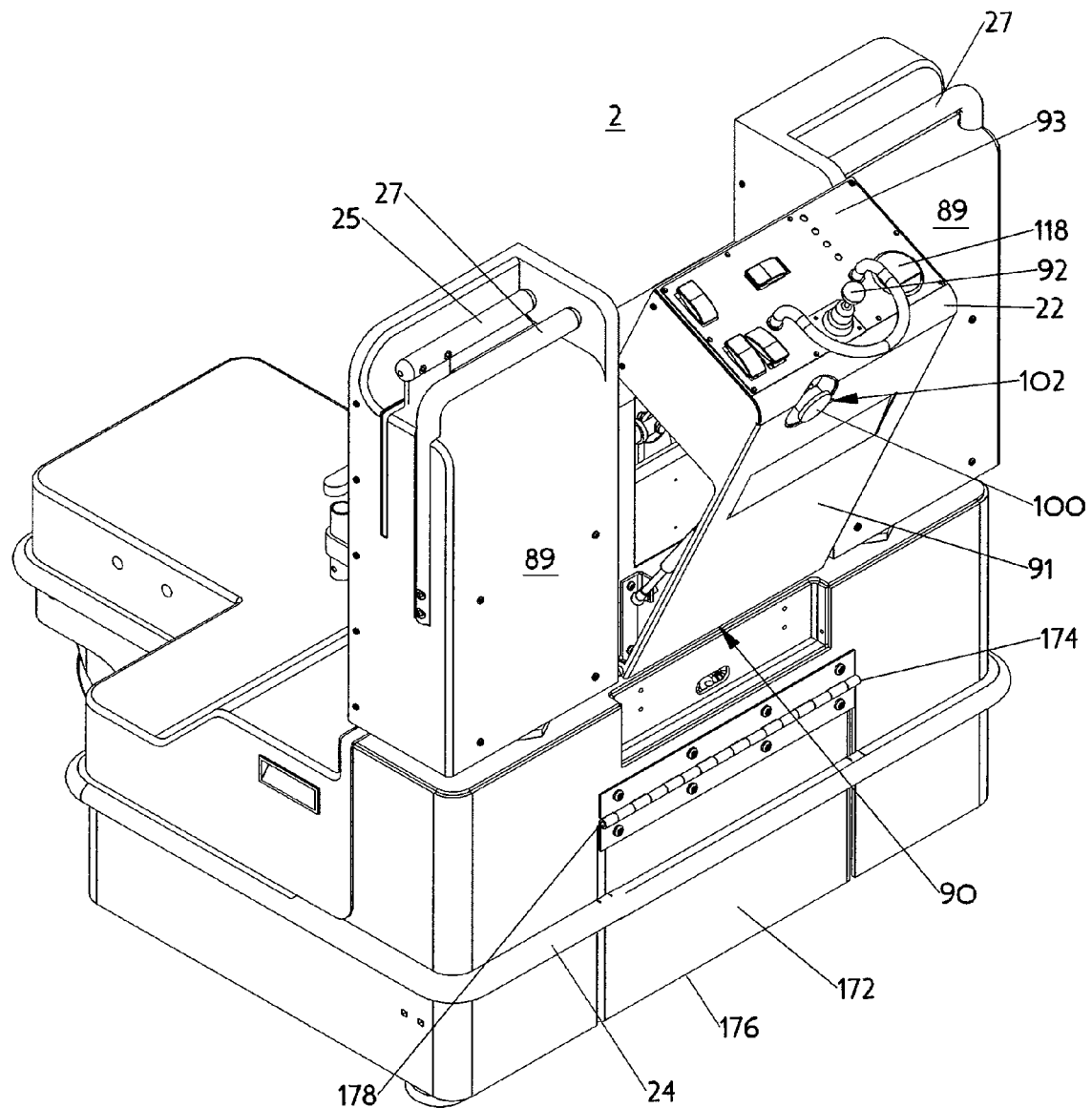
FIG. 3 is a perspective view of the operator side (i.e., rear side) of the bed mover.

As can be understood from FIGS. 1-3 and as most clearly depicted in FIG. 4, to disengage the jaws 26 from the bed frame 20 via the emergency bed release lever 25, the top portion of the lever 25 is grasped and displaced away from the control panel 22 of the mover 2 such that the lever 25 pivots about the pivot pin 29. As indicated in FIG. 4, this pivoting of the lever 25 causes the first pin 46 to be released from the notch 35 of the lever 25, thereby freeing the left end of the actuator 34 from its attachment to the frame of the attachment portion 8. The pivoting of the lever 25 also causes a free end 39 of the linkage 31 to push against the now freed left end of the actuator 34, thereby urging the actuator 34 to the right and causing the jaws 26 to converge towards each other. In one embodiment, as illustrated in FIG. 2, where the jaws 26 open in opposite directions, the urging to the right of the actuator 34 by the linkage 31 causes the jaws 26 to disengage from the bed frame 20. Thus, the emergency bed release lever 25 allows a user to disengage the mover 2 from a bed 4 when the mover 2 has de-energized, become inoperable or otherwise malfunctioned.

Figure 5:
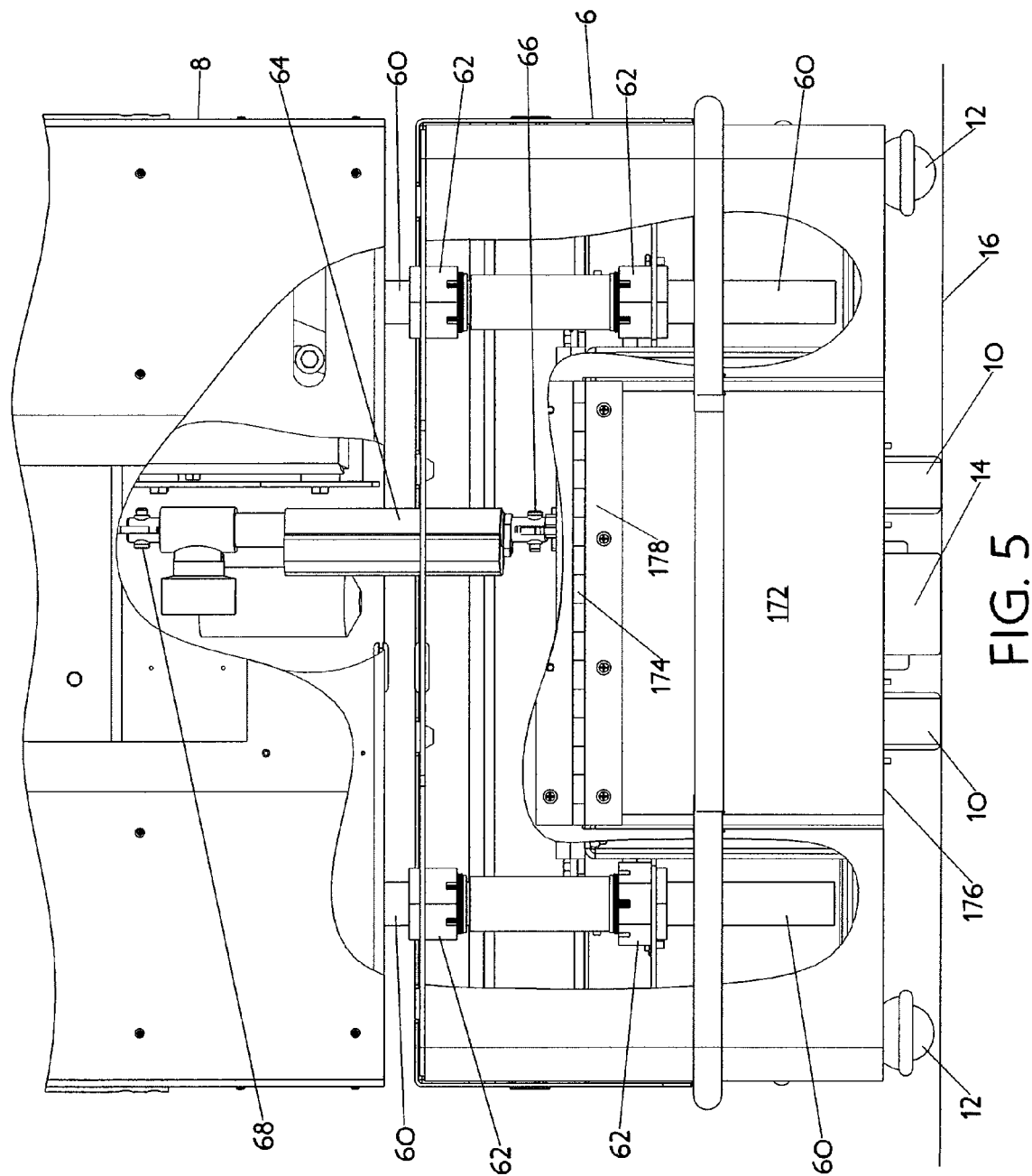
FIG. 5 is an elevation of the rear of the base and attachment portions with portions of their respective housings partially cut away to disclose features of the elevator mechanism that supports the attachment portion above the base portion and allows the elevation of the attachment portion to be adjusted.

As indicated in FIG. 1 and more fully illustrated in FIG. 5, which is an elevation of the rear of the base and attachment portions 6, 8 with portions of their respective housings partially cut away to disclose features of the elevator mechanism, the attachment portion 8 is vertically, adjustably supported above the base portion 6 via the elevator mechanism. In one embodiment, the elevator mechanism includes a pair of vertically oriented rods 60, bushings 62 and a vertically oriented actuator 64.

As shown in FIG. 4, a lower end of the actuator 64 is attached to the frame of the base portion 6 via a pin 66, and an upper end of the actuator 64 is attached to the frame of the attachment portion 8 via another pin 68. The bushings 62 are fixed to the frame of the base portion 6, and the rods 60 are vertically, slidably displaceable within the bushings 62 and fixedly coupled to the frame of the attachment portion 8 at an upper portion of each rod 60. Thus, as the actuator 64 extends such that the distance between the pins 66, 68 increases, the rods 60 slide upwardly within the bushings 62 and the attachment portion's elevation above the base portion 6 increases. Conversely, as the actuator 64 retracts such that the distance between the pins 66, 68 decreases, the rods 60 slide downwardly within the bushings 62 and the attachment portion's elevation above the base portion 6 decreases. Thus, the elevator mechanism allows a user to adjust the elevation of the jaws 26 above the travel surface 16.

Figure 6:
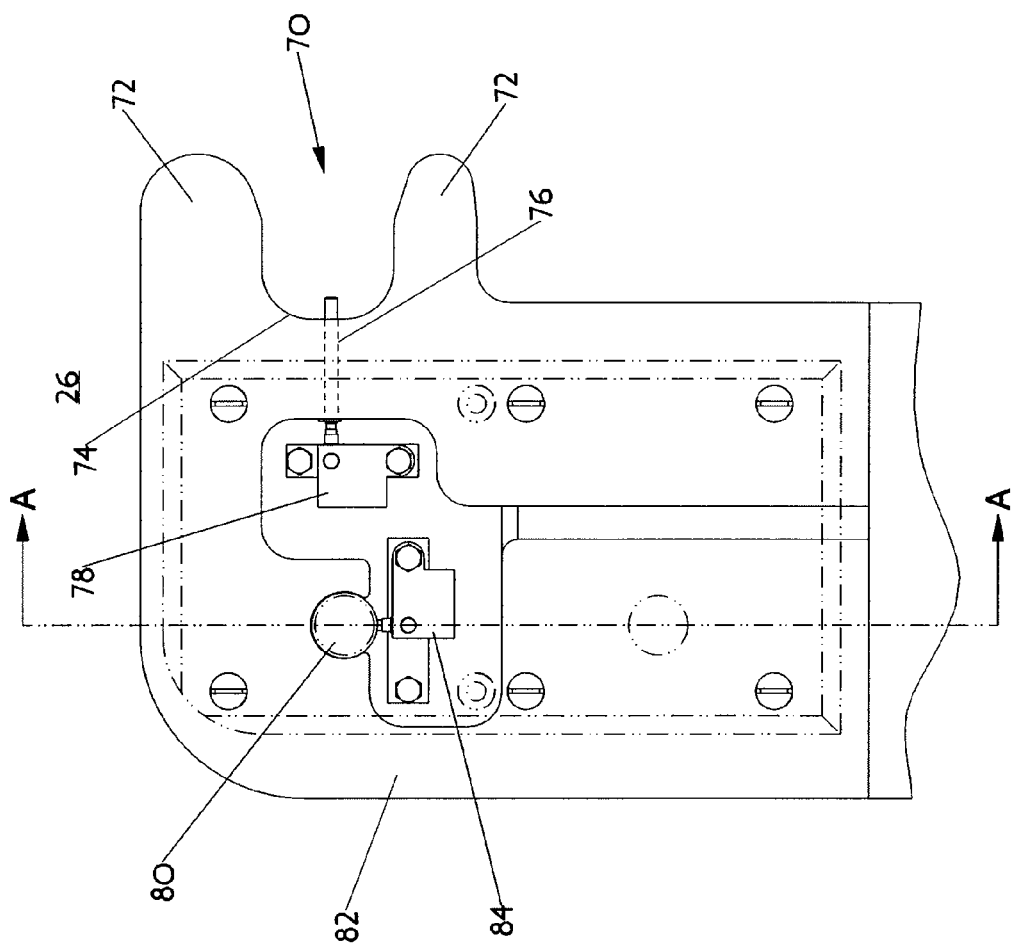
FIG. 6 is a bottom view of a jaw depicted in FIG. 2.
Figure 7:
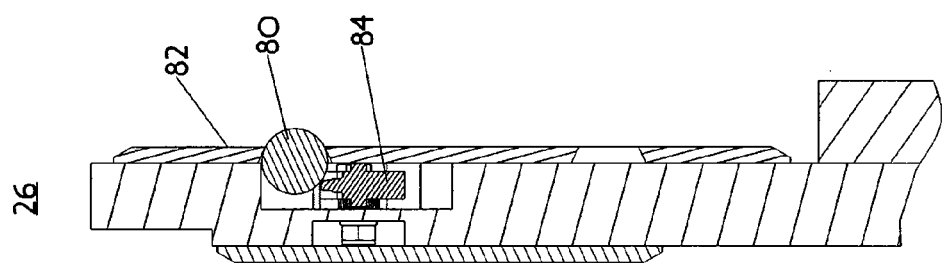
FIG. 7 is a sectional elevation of the jaw as taken along section line AA in FIG. 6.

For a discussion of the features of one embodiment of the jaw 26, reference is now made to FIGS. 2, 6 and 7. FIG. 6 is a bottom view of a jaw 26 depicted in FIG. 2. FIG. 7 is a sectional elevation of the jaw 26 as taken along section line AA in FIG. 6. As depicted in FIGS. 2 and 6, each jaw 26 has an opening 70 defined by two adjacent fingers 72 and an arcuate recessed edge 74. The configuration of the opening 70 allows a jaw 26 to engage the bed frame 20.

As shown in FIG. 6, for each jaw 26, a first end of a contact pin 76 protrudes from the arcuate recessed edge 74 into the opening 70. The contact pin 76 extends into the jaw 26 such that the pin's second end encounters a contact switch 78. Thus, when the bed frame 20 enters the opening 70 as the jaw 26 engages the bed frame 20, the bed frame 20 will push the contact pin 76 into the jaw 26. Once the bed frame 20 has fully entered the jaw 26, the contact pin 76 will be fully pressed in and the contact switch 78 will be actuated to indicate to the mover 2 and its user that the jaw 26 has fully engaged the bed frame 20.

As indicated in FIGS. 6 and 7, a sphere 80 partially emanates from the bottom surface 82 of each jaw 26. As will be explained in greater detail later in this Detailed Description, during one method of engaging the bed frame 20 with the jaws 26, the jaws 26 are brought forward towards the bed frame 20 and lowered until the spheres 80 are brought into contact with a generally horizontal surface of the bed frame 20. The jaws 26 continue to lower until their spheres 80 are brought sufficiently into contact with their contact switches 84 such that the contact switches 84 are actuated. Actuation of the contact switches 84 indicates to the mover 2 and its user that the jaws 26 are ready to be diverged (or depending on the embodiment and its jaw orientation, converged) in order to engage the bed frame 20.

Figure 8:
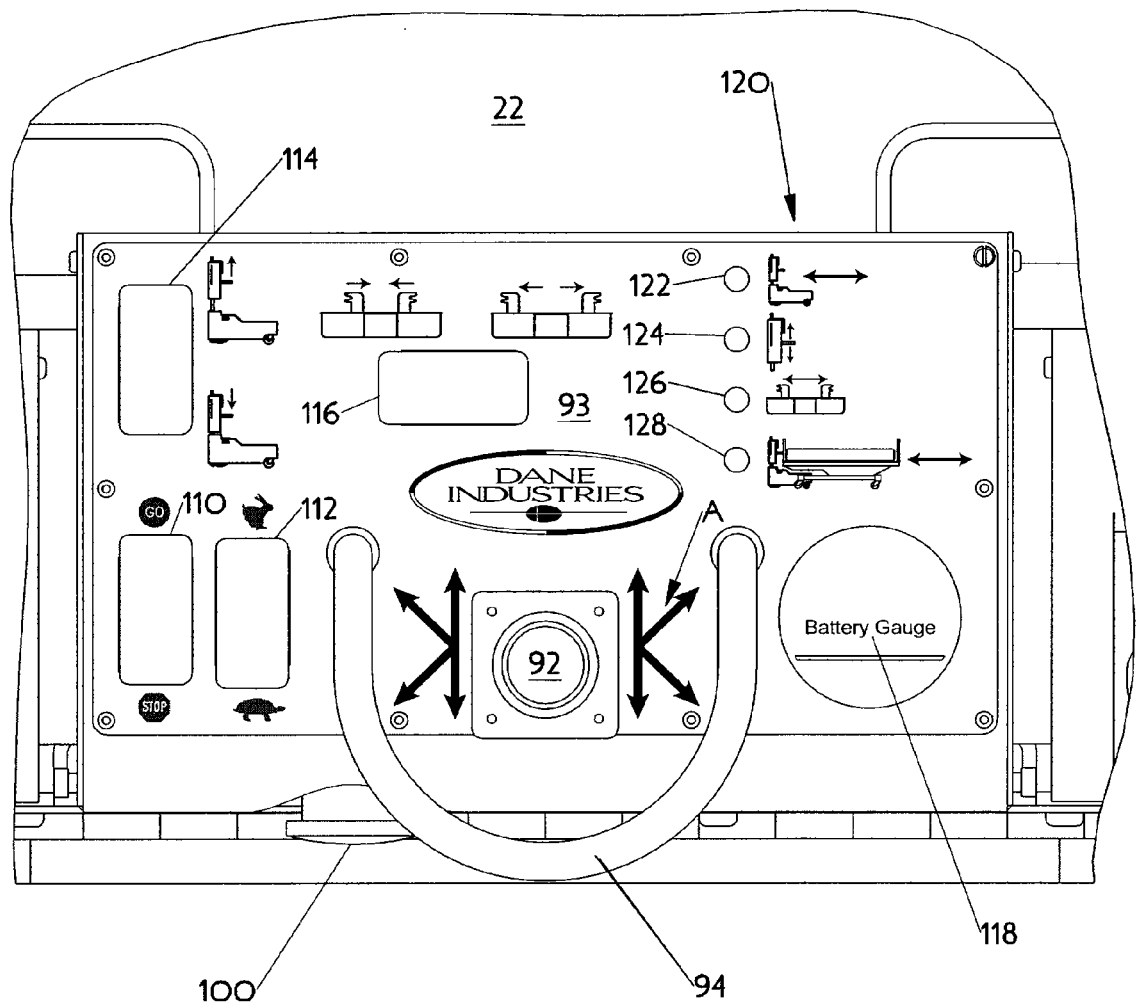
FIG. 8 is a top plan view of the control panel.

For a discussion of the control panel 22, reference is now made to FIGS. 2, 3 and 8. FIG. 8 is a top plan view of the control panel 22. As indicated in FIG. 3, in one embodiment, the control panel 22 is pivotally connected to the attachment portion 8 via a hinge 90. The hinge 90 allows the control panel 22 to be tipped rearward (as depicted in FIGS. 1 and 3), which makes it possible for a user to manipulate the controls on the control panel 22 and walk immediately behind the mover 2 without kicking the rear side of the mover 2. The hinge 90 also allows the control panel 22 to be placed in the fully upward position (as depicted in FIG. 2) such that the rear side 91 of the control panel 22 becomes generally flush with the rear side 89 of the mover 2. This allows the mover 2 to fit in an elevator while attached to a hospital bed 4 or to be stored in a relatively small storage area.

As shown in FIGS. 2, 3 and 8, a joystick 92 is located on the top surface 93 of the control panel 22. The joystick 92 is used to control the speed and direction of the mover 2. As indicated in FIGS. 2 and 8, a hand rest 94 is located on the top surface 93 of the control panel 22 and, in one embodiment, partially surrounds the joy stick 94. To prevent the formation of a feedback loop, a user places his wrist into contact with the hand rest 94 while he manipulates the joystick 92. This allows for more precise and controlled operation of the mover 2.

As illustrated in FIG. 3, an emergency shut-off switch 100 and a corresponding indicator light 102 are located on the upper portion of the rear side 91 of the control panel 22. The emergency shut-off switch 100, which, in one embodiment, is a mushroom type switch, cuts off all power to the mover 2. The corresponding indicator light 102 is illuminated when the emergency shut-off switch 100 has been engaged, thereby notifying the user that the shut-off switch 100 must be disengaged before the mover 2 can be operated.

As shown in FIG. 8, in addition to the joystick 92, the hand rest 94 and the emergency shut-off switch 100, the control panel 22 also includes an on/off switch 110, a high/low speed switch 112, a jaw elevation switch 114, a jaw convergence/divergence switch 116, a battery gauge 118, and four status indicator lights 120. In one embodiment, the switches 110-116 are rocker-type switches.

The first indicator light 122 of the status indicator lights 120 is illuminated when the jaws 26 of the mover 2 are not engaged with a bed frame 20 and one of the support castors 10 (as will be discussed in detail later in this Detailed Description) is locked. The second indicator light 124 of the status indicator lights 120 is illuminated when the contact switches 84 have been actuated by the jaw spheres 80 fully abutting against a horizontal surface of the bed frame 20. The third indicator light 126 of the status indicator lights 120 is illuminated when the contact switches 78 have been actuated by the jaw contact pins 76 fully abutting against a bed frame 20. The fourth indicator light 128 of the status indicator lights 120 is illuminated when the illuminating conditions for the second and third indicator lights 124, 126 are met and the support castors 10 are unlocked.

As indicated in FIG. 8, the mover 2 may be shut off or turned on via the on/off switch 110. The high/low speed switch 112 allows a user to select a high speed of travel or a low speed of travel for the mover 2. The jaw elevation switch 114 may be used to raise or lower the attachment portion 8 and, as a result, the jaws 26. The jaw convergence/divergence switch 116 may be used to cause the jaws 26 to diverge or converge in order to cause the jaws 26 to engage or disengage the bed frame 20. The battery gauge 118 indicates the remaining charge left in the batteries of the mover 2.

The joystick 92 is used to control the mover's direction of travel and its speed. For example, as indicated in FIG. 8, by displacing the joy stick 92 in the direction indicated by arrow A, the drive wheel 14 is caused to pivot about a vertical axis such that the axis of the drive wheel's axle is generally perpendicular to arrow A. The mover 2 will then travel in the direction of arrow A. The greater the extent of joy stick displacement in the direction of arrow A, the greater the speed of travel by the mover 2. Thus, if the joystick 92 is only slightly displaced in the direction of arrow A, the drive wheel 14 will turn relatively slowly and, as a result, the mover 2 will travel relatively slowly. Conversely, if the joystick 92 is greatly displaced in the direction of arrow A, the drive wheel 14 will turn relatively quickly and, as a result, the mover 2 will travel relatively quickly.

In one embodiment, the joystick 14 utilizes a simple rectangular X-Y coordinate control system. For example, the Y-axis pertains to the magnitude of speed and the direction of drive wheel rotation. The X-axis pertains to the degree of right or left deviation from straightforward or rearward travel. Such a joystick control system is a model 7FR1ES24 as manufactured by Italsea, Inc., Via Gasdotto, 65/B 36078, Valdagno (VI), Italy.

In one embodiment, the joystick 14 utilizes an X-Y coordinate control system and the control system converts the X and Y coordinate positions to polar coordinates through software calculations. In such a system, the speed of the drive wheel rotation equals the square root of the sum of $X^2+Y^2$, and the angle of steering equals the inverse tangent of X divided by Y.

In one embodiment, the joystick utilizes a polar coordinate control system. For example, the magnitude of speed is controlled by the extent to which the joystick 92 is displaced from vertical, and the direction of travel is controlled by direction of displacement for the joystick 92.

Figure 10:
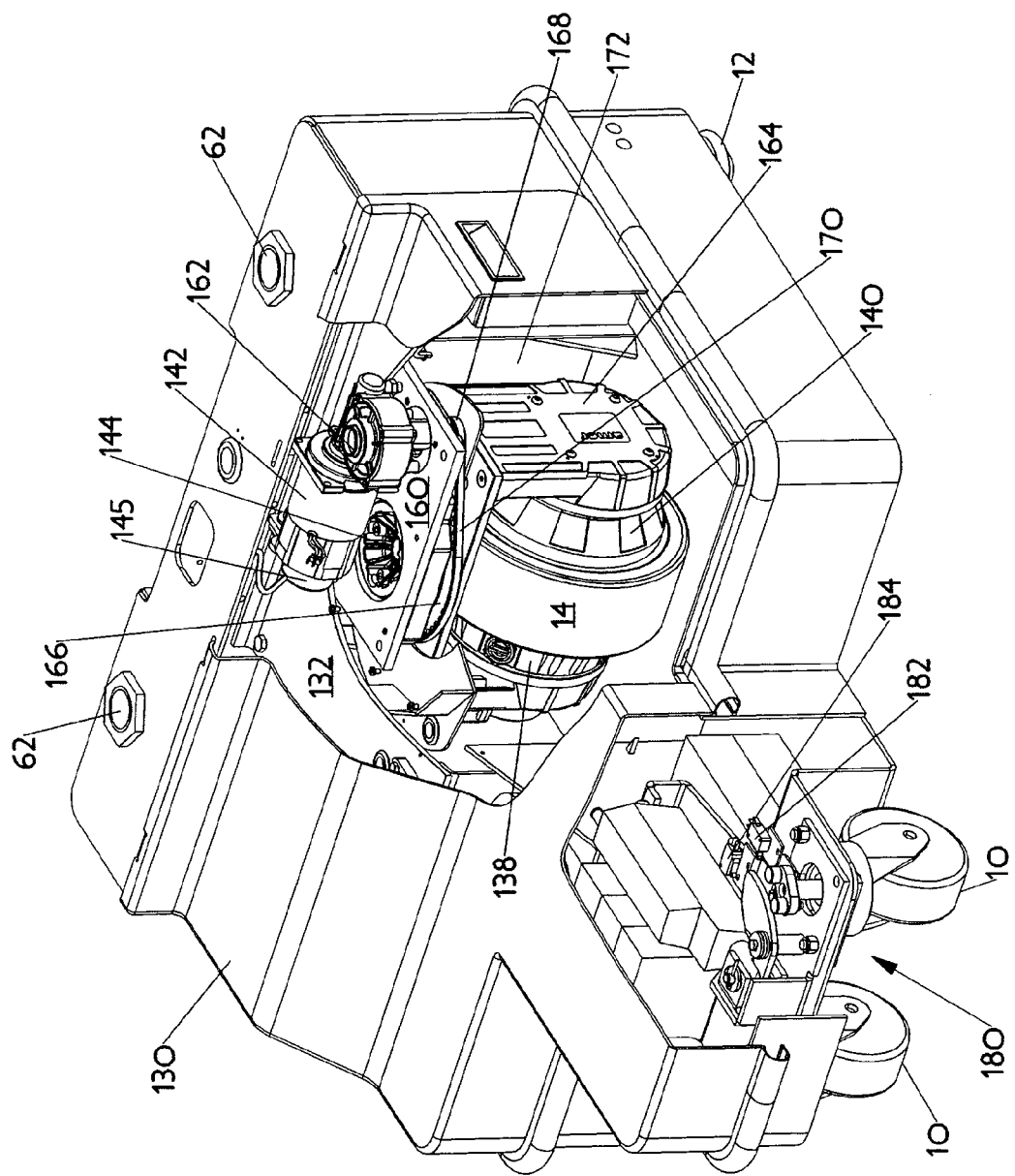
FIG. 10 is a perspective view of the base portion wherein a portion of the upper housing and most of the components depicted in FIG. 9 have been removed to reveal the drive wheel and its related components.

For a discussion of the components of the base portion 6, reference is now made to FIG. 9A, 9B and 10. FIG. 9A is a perspective view of the base portion 6 with its upper housing 130 shown in phantom lines to reveal various components of the mover 2 that are housed within the base portion 6. FIG. 9B is side elevation of an electrical box 150 as viewed from arrow B in FIG. 9A. FIG. 10 is a perspective view of the base portion 6 wherein a portion of the upper housing 130 and most of the components depicted in FIG. 9A have been removed to reveal the drive wheel 14 and its related components.

As indicated in FIG. 9A, a mounting plate 132, which is fixed to the frame of the base portion 6, extends generally horizontally through an upper area of the base portion 6. A motor controller 134 and a steering controller 136 are mounted on the mounting plate 132. The motor controller 134 is in electrical communication with the joy stick 92, the on/off switch 110, the high/low speed switch 112, and an electric motor 138 mounted in a hub 140 of the drive wheel 14 (see FIG. 10). The motor controller 134 controls the speed and direction of rotation for the electric motor 138 according to the inputs the motor controller receives from the controls on the control panel 22. An exemplary motor controller 134 is a model CH4Q100 as manufactured by Italsea, Inc., Via Gasdotto, 65/B 36078, Valdagno (VI), Italy.

The steering controller 136 depicted in FIG. 9A is in electrical communication with the joy stick 92 and a steering motor 142 that pivots the drive wheel 14 about a vertical steering axis 144 to cause the drive wheel 14 to travel in the correct direction (see FIG. 10). The steering controller 136 controls the directional orientation of the drive wheel 14 via the steering motor 142 according to the inputs the steering controller 136 receives from the controls (namely the joy stick 92) on the control panel 22. An exemplary steering controller 136 is a model 7FR1ES24 as manufactured by Italsea, Inc., Via Gasdotto, 65/B 36078, Valdagno (VI), Italy.

As shown in FIG. 9A, the base portion includes rechargeable batteries 146 that provide power to the mover's components. As indicated in FIG. 9A, the batteries 146 are mounted in a lower area of the base portion 6 to act as ballast to provide a low center of gravity for the mover 2. The mover's low center of gravity and overall weight for tractive adhesion of the drive wheel 14 to the travel surface 16 is further improved by weights 148 mounted in a lower area of the base portion 6.

As indicated in FIGS. 9A and 9B, an electrical box 150 extends through the upper housing 130. This electrical box 150 comprises a battery disconnect switch 152 and a female electrical connector 154 for connecting the mover 2 with a power supply to charge its batteries 146.

As shown in FIG. 10, a second mounting plate 160 extends generally horizontal through an upper area of the base portion 6 and is fixed to the frame of the base portion 6. The steering motor 142 is mounted on the second mounting plate 160 and is mechanically coupled to a steering gear box 162. The drive wheel assembly, which includes the drive wheel 14, the drive wheel hub 140, the electric motor 138, and a wheel fork assembly 164 coupled to a large sheave or sprocket gear 166, is pivotally coupled about the vertical steering axis 144 to the second mounting plate 160. The steering gear box 162 is mechanically coupled to a small sheave or sprocket gear 168, which is coupled to the large sheave or sprocket gear 166 via a belt or chain 170. Thus, the steering motor 142, via the steering gear box 162, sprocket gears 166, 168 and chain 170, may cause the drive wheel assembly to pivot about the vertical steering axis 144 when told to do so by the steering controller 136. A position sensor 145 on the steering motor 142 keeps track of the revolutions of the drive wheel assembly to monitor the orientation of the drive wheel assembly.

Figure 11:
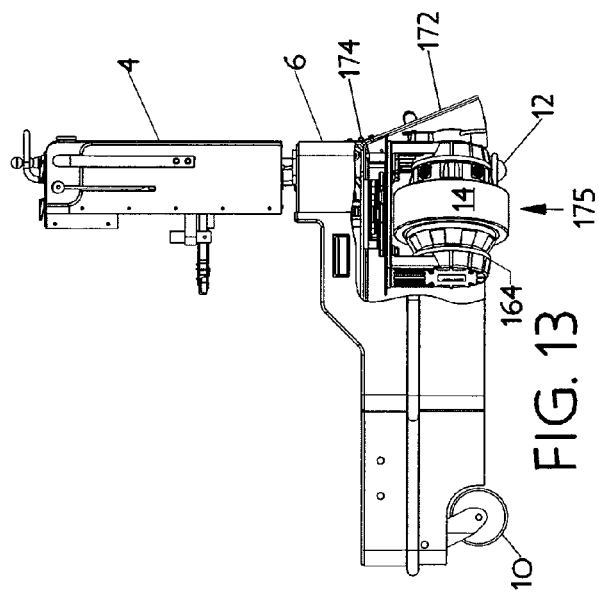
FIG. 11 is a side elevation of the mover with part of the housing of the base portion removed to show the drive wheel assembly oriented generally longitudinally relative to the mover.
Figure 12:
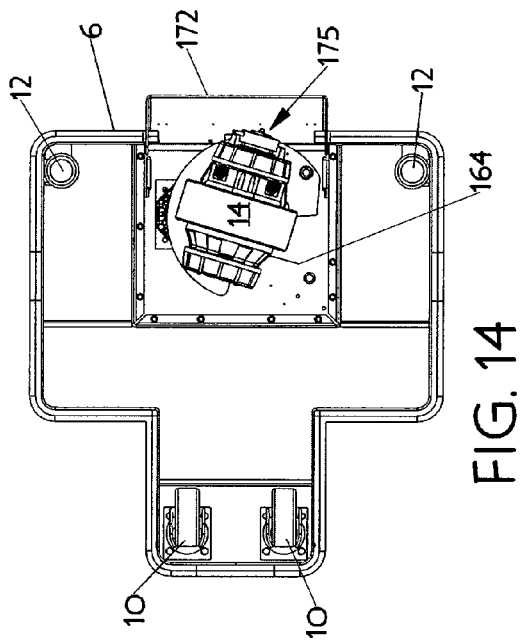
FIG. 12 is a bottom view of the mover with the drive wheel assembly oriented generally longitudinally relative to the mover as depicted in FIG. 11.
Figure 13:
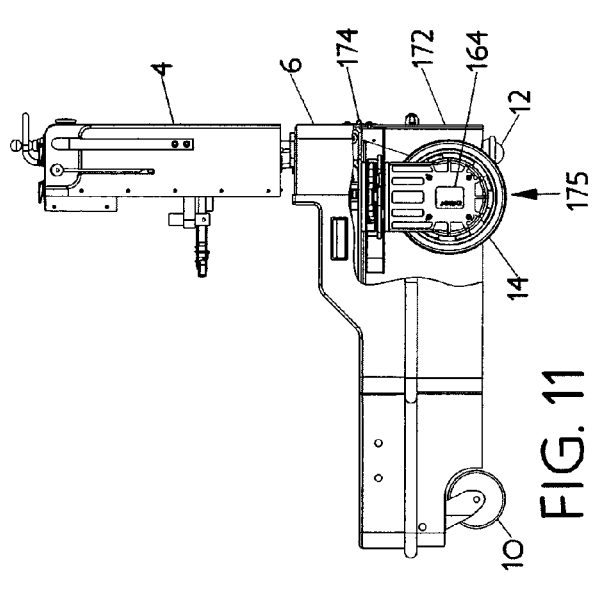
FIG. 13 is a side elevation of the mover with part of the housing of the base portion removed to show the drive wheel assembly oriented generally laterally relative to the mover.
Figure 14:
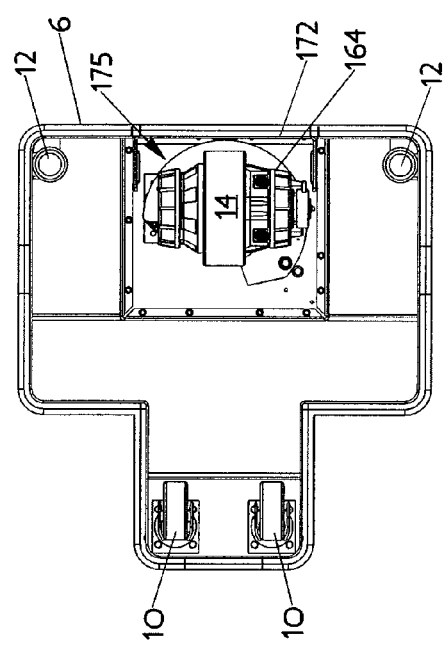
FIG. 14 is a bottom view of the mover with the drive wheel assembly oriented generally laterally relative to the mover as depicted in FIG. 13.

For a discussion of a rear flap feature of one embodiment of the mover 2, reference is now made to FIGS. 10-14. FIG. 11 is a side elevation of the mover 2 with part of the housing of the base portion 6 removed to show the drive wheel assembly 175 oriented generally longitudinally relative to the mover 2. FIG. 12 is a bottom view of the mover 2 with the drive wheel assembly 175 oriented generally longitudinally relative to the mover 2 as depicted in FIG. 11. FIG. 13 is a side elevation of the mover 2 with part of the housing of the base portion 6 removed to show the drive wheel assembly 175 oriented generally laterally relative to the mover 2. FIG. 14 is a bottom view of the mover 2 with, the drive wheel assembly 175 oriented generally laterally relative to the mover 2 as depicted in FIG. 13.

As depicted in FIGS. 10-12, in one embodiment, the vertical steering axis 144 is positioned relatively close to the rear of the mover 2 such that the outer circumference of the drive wheel 14 nearly touches the interior surface of a hinged flap 172. As can be understood from FIGS. 11-14, in one embodiment, the wheel fork assembly 164 is wider than the outer circumferential diameter of the drive wheel 14. Thus, as indicated in FIGS. 13 and 14, when the drive wheel assembly 175 is pivoted about the vertical steering axis 144 such that the drive wheel 14 is oriented generally laterally relative to the mover 2 and the wheel fork assembly 164 is oriented generally longitudinally relative to the mover 2, the extreme ends of the wheel fork assembly 164 will abut against the interior surface of the hinged flap 172 and cause the hinged flap 172 to displace outwardly about the flap's hinges 174 (see FIGS. 3 and 5) to provide the clearance necessary to allow the drive wheel assembly to pivot. The hinged flap 172 is advantageous because it allows the overall length of the mover 2 to be shorter than it would otherwise be were the housing of the base portion 6 required to be long enough to allow the drive wheel assembly to pivot without abutting the interior surface of the housing. The shorter overall length of the mover 2 increases its storability and its ability to fit into an elevator while engaged to a bed 4.

In another embodiment of the flap 172 that is similar to the embodiment depicted in FIGS. 3 and 5, except the hinges 174 are relocated from the top edge 178 of the flap 172 to the bottom edge 176 of the flap, the top edge 178 of the flap 172 may pivot down about the hinges 174 at the bottom edge 176 of the flap 172 until the flap 172 is generally horizontal. This allows the flap 172 to become a platform 172 on which the user may ride while moving a hospital bed 4 with the mover 2. In such a configuration, the flap (platform) 172 may still serve its drive wheel assembly clearance purpose while providing a user the ability to ride the mover 2. By riding the platform 172, the user's weight is added to the weight of the mover 2 and increases the tractive adhesion of the drive wheel 14 to the travel surface 16. Since the flap (platform) 172 may fold up, the mover 2 may still be stored in a relatively small area or fit into an elevator while engaged to a bed 4.

Operation of a machine with a steerable wheel is optimized by providing at least one fixed wheel or non-swivel castor. The fixed wheel or non-swivel castor may be on the hospital bed 4 or on the mover 2. As shown in FIG. 10, in one embodiment, to allow the mover 2 be maneuvered when not engaged with a hospital bed 4 or to allow for hospital beds 4 that do not have fixed or fixable castors 21, the mover 2 has an electrically actuated locking mechanism 180 for locking at least one of the support castors 10 to prevent the support castor 10 from freely pivoting about its vertical axis.

As illustrated in FIG. 10, the locking mechanism 180 includes a lock position indicator 182 and a released position indicator 184. The lock position indicator 182 is in electrical communication with the control panel 22 and indicates when the associated support castor 10 is locked. The released position indicator 184 is in electrical communication with the control panel 22 and indicates when the associated support castor 10 is free to pivot about its vertical axis.

Figure 15:
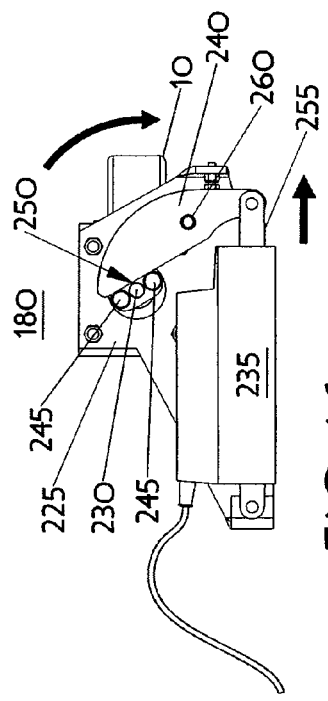
FIG. 15 is a plan view of the locking mechanism in the open position.
Figure 16:
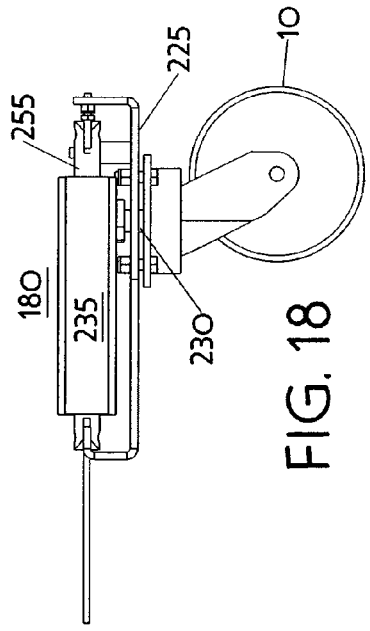
FIG. 16 is a plan view of the locking mechanism in the closed position.
Figure 17:
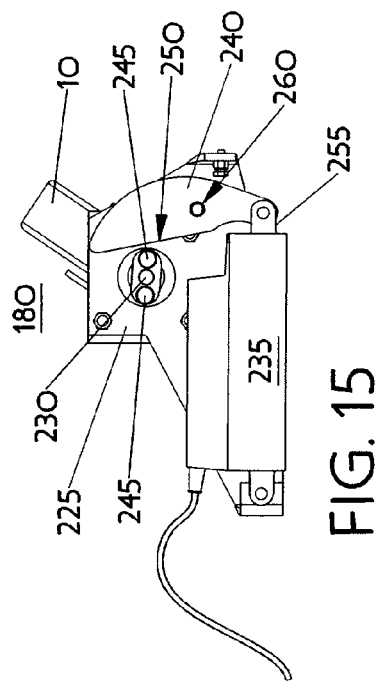
FIG. 17 is a side elevation view of the locking mechanism in the open position.
Figure 18:
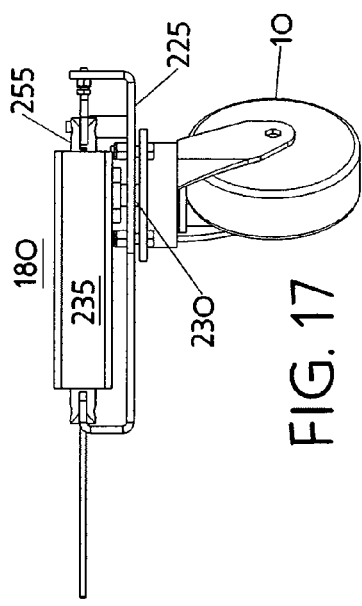
FIG. 18 is a side elevation view of the locking mechanism in the closed position.
Figure 19:
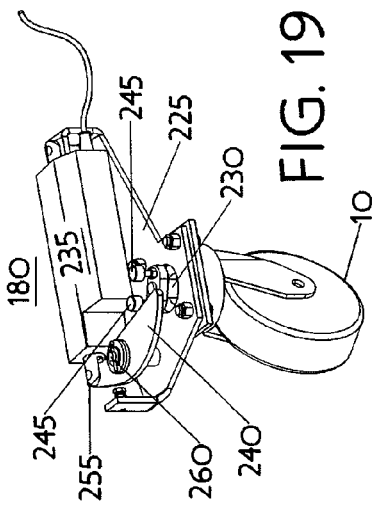
FIG. 19 is a side perspective view of the locking mechanism in the open position.

For a more detailed view of the elements of the locking mechanism 180, reference is now made to FIGS. 15-19. FIG. 15 is a plan view of the locking, mechanism 180 in the open position. FIG. 16 is a plan view of the locking mechanism 180 in the closed position. FIG. 17 is a side elevation view of the locking mechanism 180 in the open position. FIG. 18 is a side elevation view of the locking mechanism 180 in the closed position. FIG. 19 is a side perspective view of the locking mechanism 180 in the open position.

As shown in FIGS. 15-19, the locking mechanism 180 includes a mount surface 225, a castor pivot shaft 230, a support castor 10, an electric actuator 235, a cam 240 and bearing studs 245. The support castor 10 is pivotally mounted via the pivot shaft 230 to the mount surface 225. The bearing studs 245 are coupled to, and on both side of, the pivot shaft 230. The cam 240 is pivotally pinned to the mount surface 225. The cam 240 has an edge 250 for engaging the bearing studs 245. The cam 240 pivotally displaces in a plane that is perpendicular to the axis of the bearing studs 245.

To fix the support castor 10 to prevent it from pivoting about its pivot shaft 230, the electric actuator 235 extends its shaft 255. The shaft 255 causes the cam 240 to pivot about its pivot point 260, bringing the edge 250 against the bearing studs 225. As the cam 240 presses against the bearing studs 255, the pivot shaft 230 rotates, thereby causing the support castor 10 to lock into a front-oriented position, as illustrated in FIGS. 16 and 18.

To release the support castor 10 from being fixed in the front-oriented position, the electric actuator 235 retracts the shaft 255, which disengages the cam from the studs 245, as illustrated in FIGS. 15, 17, and 19. The support castor 10 is once again free to pivot about the pivot shaft 230.

In one embodiment, the actuator 235 is actuated automatically to lock the support castor 10 when none of the contact switches 78, 84 in the jaws 26 have been actuated. In one embodiment, the actuator 235 is actuated automatically to release (unlock) the support castor 10 when all of the contact switches 78, 84 in the jaws have been actuated. In one embodiment, the actuator 235 is actuated by a button on the control panel 22. In one embodiment, the locking mechanism 180 is provided with a lever to manually actuate the mechanism 180.

Figure 21:
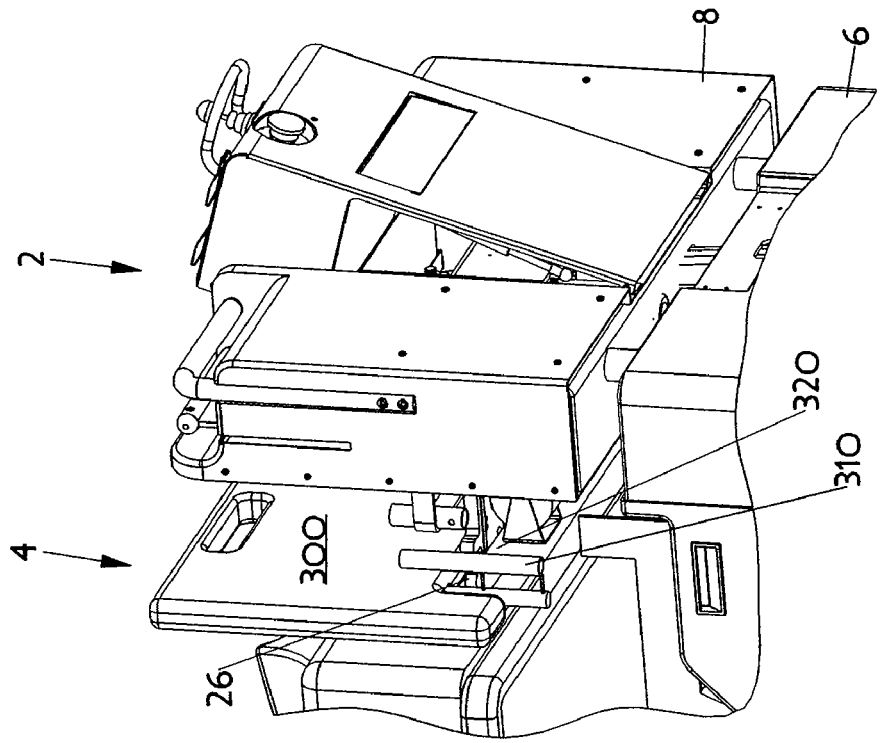
FIG. 21 is a rear perspective view of the mover wherein the jaws have adjusted for height to clear the headboard or footboard of the bed and converged to clear the vertical posts of the bed frame.
Figure 20:
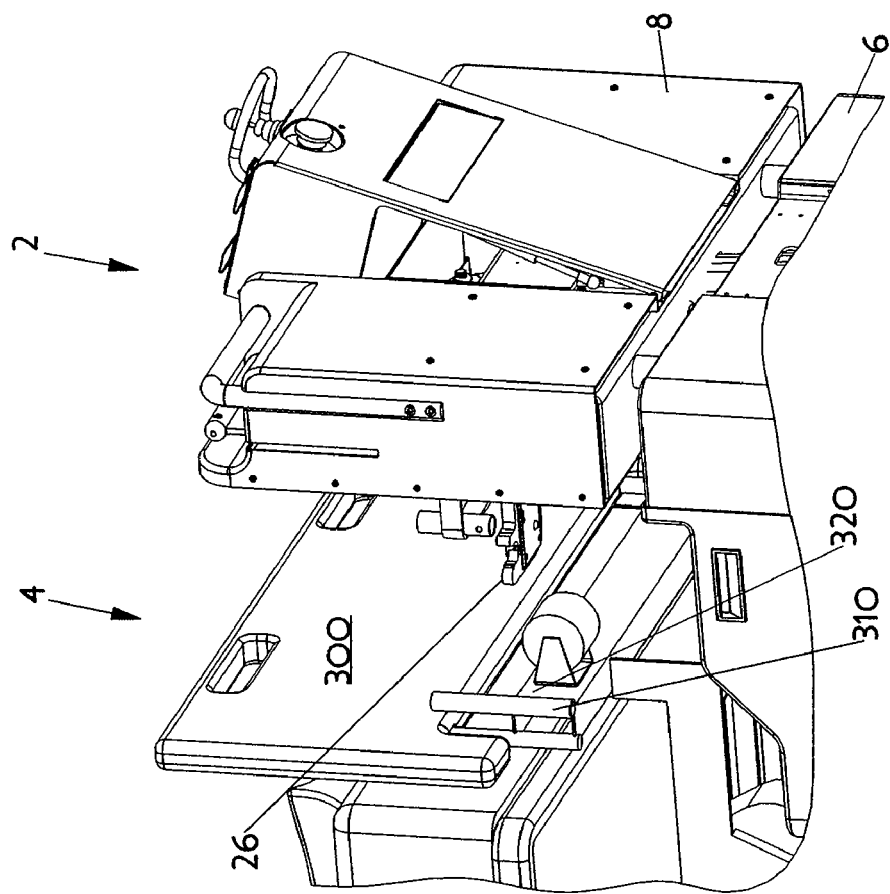
FIG. 20 is a rear perspective view of the mover approaching a bed to engage the bed with the mover's jaws.

For a discussion of a method of engaging a hospital bed 4 with the bed mover 2 of the subject invention, reference is now made to FIGS. 20-24, which are rear perspective views of the mover 2 at successive stages of becoming engaged with the bed 4. A support castor 10 is locked with the locking mechanism 180 to allow the mover 2 to be maneuvered. The jaw side of the mover 2 approaches the end of a hospital bed 4 as shown in FIG. 20. The attachment portion 8 and, as a result, the jaws 26 are adjusted for elevation such that the jaws 26 will pass under the headboard or footboard 300 of the bed 4. The jaws 26 are also converged together to pass between the vertical posts 310 of the bed frame 20. The mover 2 now progresses forward until the jaws 26 are located below the headboard or footboard 300 and between the vertical posts 310 to appear as indicated in FIG. 21.

Figure 22:
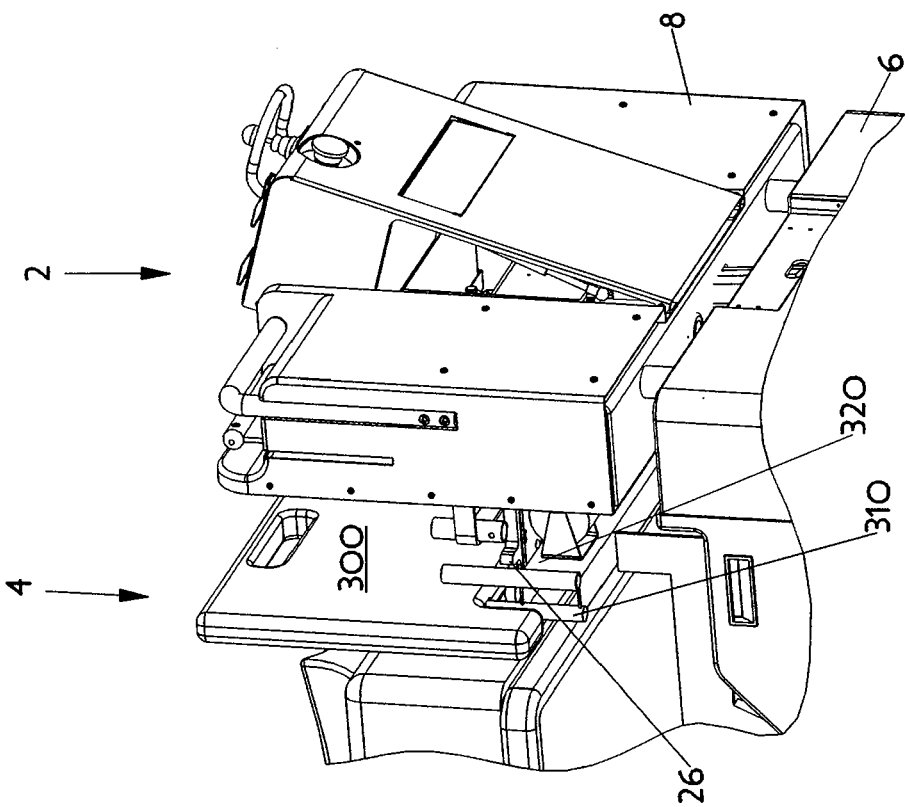
FIG. 22 is a rear perspective view of the mover wherein the jaws have lowered and made contact with a horizontal portion of the bed frame and actuated the ball contact switches in the jaws.

As indicated in FIG. 22, the attachment portion 8 and, as a result, the jaws 26 are lowered until the bottom surfaces 82 of the jaws 26 come into contact with a horizontal portion 320 of the bed frame 20. This causes the spheres 80 to actuate the contact switches 84 that indicate the jaws 26 are properly positioned with respect to elevation (see FIGS. 6 and 7).

Figure 23:
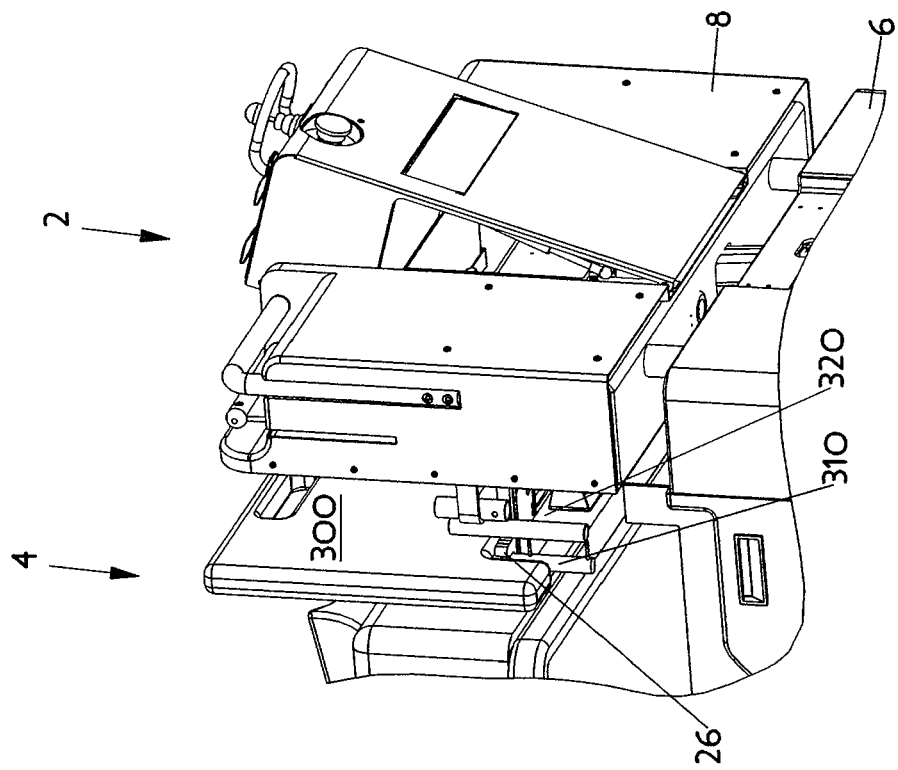
FIG. 23 is a rear perspective view of the mover wherein the jaws have diverged to engage the vertical posts of the bed frame and have actuated the pin contact switches in the jaws, indicating that the mover is now fully engaged with the bed.
Figure 24:
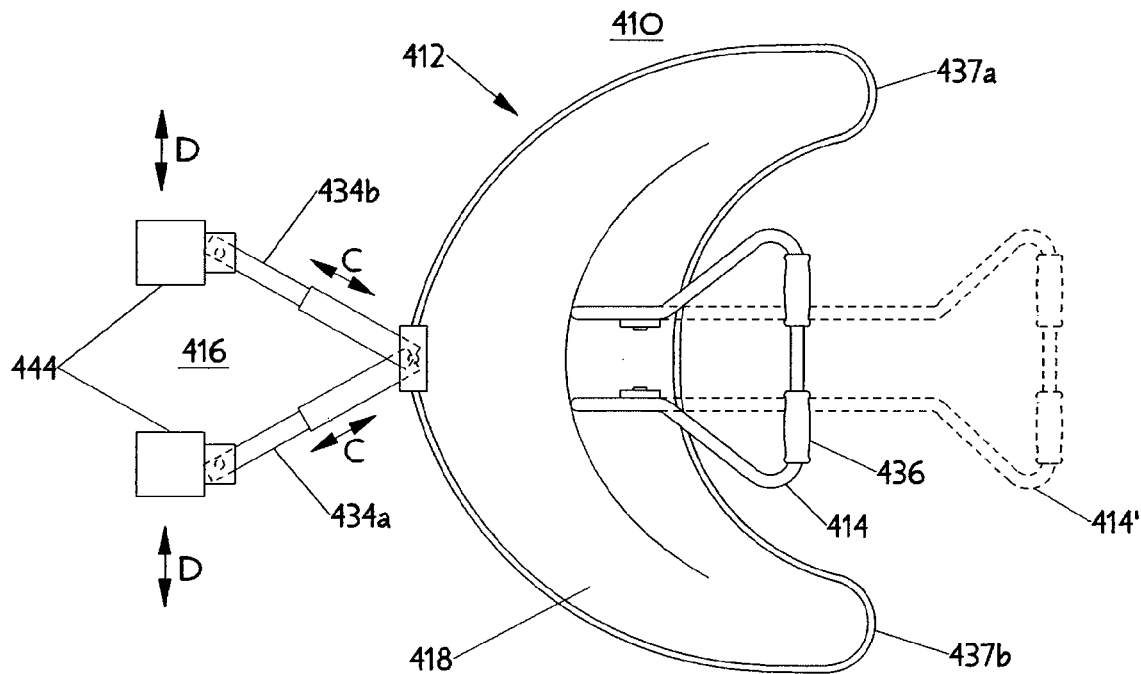
FIG. 24 is a top plan view of a power-assist machine according to a second embodiment of the present invention.
Figure 25:
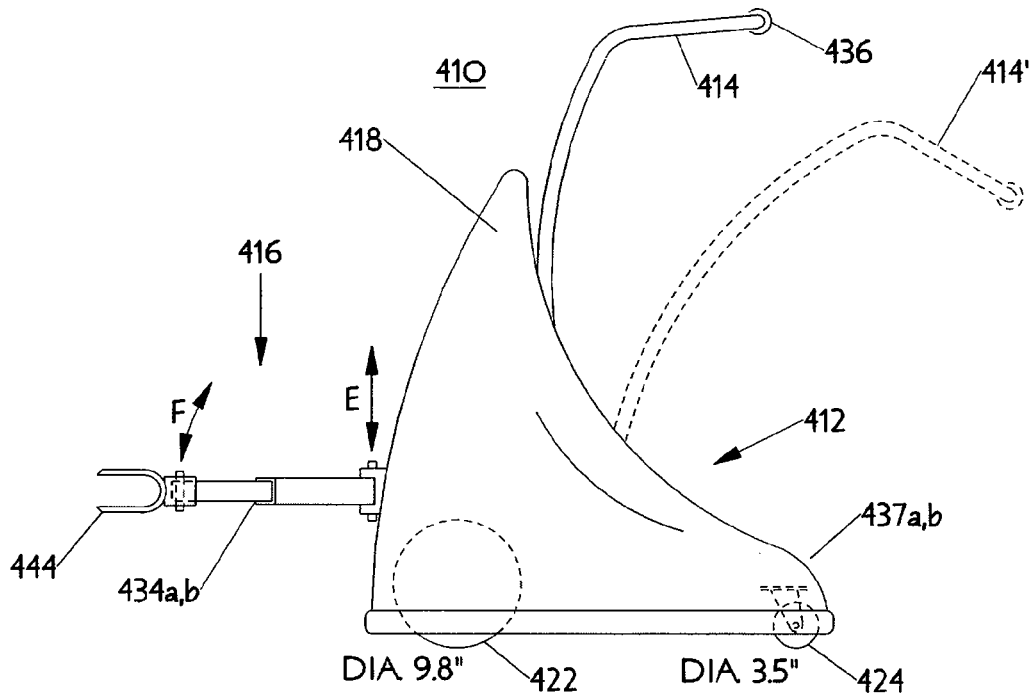
FIG. 25 is a side elevation view of the power-assist machine shown in FIG. 24.
Figure 26:
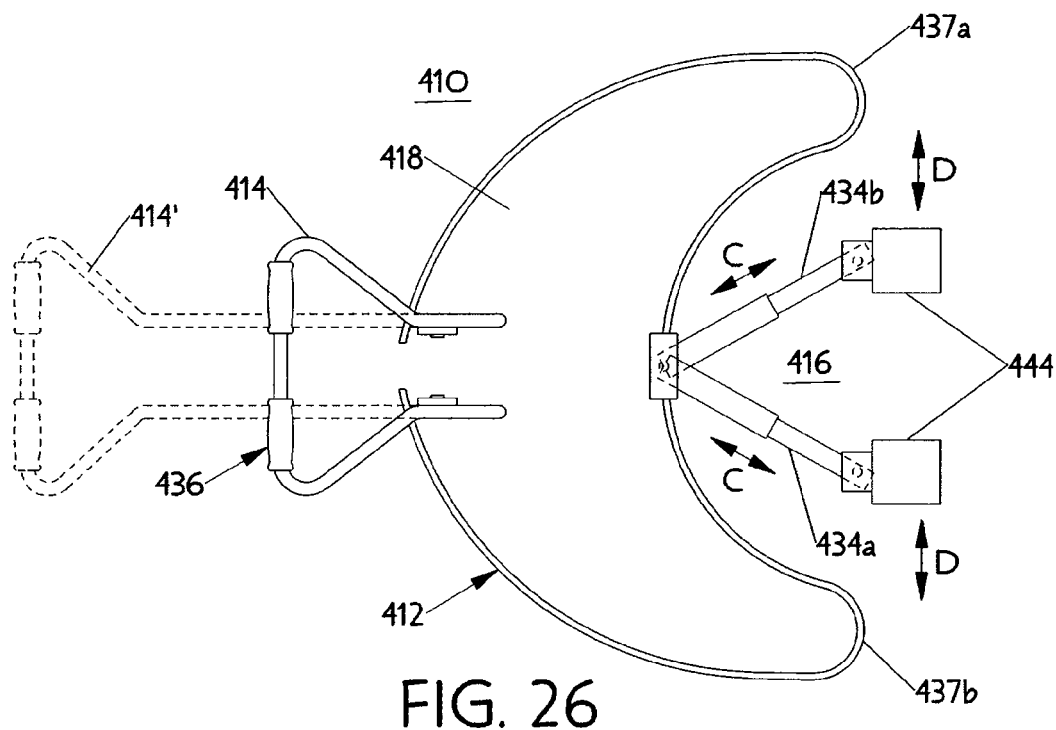
FIG. 26 is a top plan view of the power-assist machine according to a third embodiment of the present invention.
Figure 27:
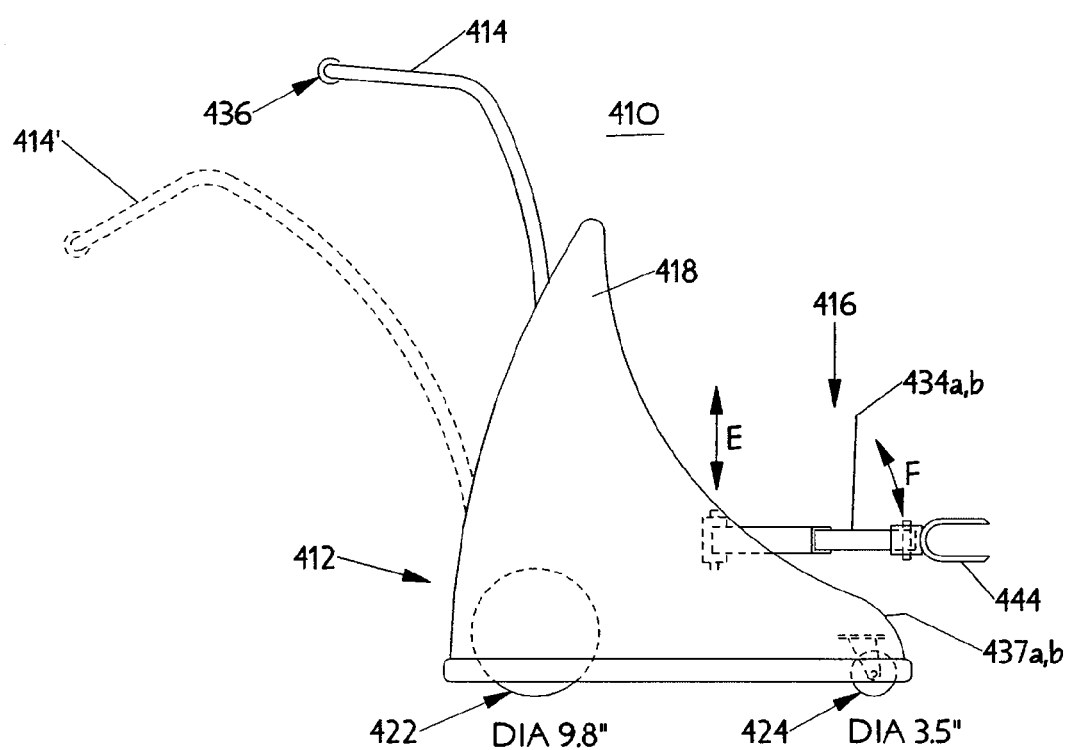
FIG. 27 is a side elevation view of the power-assist machine shown in FIG. 26.

As indicated in FIG. 23, the jaws 26 are diverged until the vertical posts 310 enter the openings 70 in the jaws 26. This causes the pins 76 to pass into the jaws 26 and actuate the contact switches 78, thereby indicating that the jaws 26 are fully and properly engaged with the bed frame 20 (see FIGS. 6 and 7). The bed mover 2 is now coupled to the bed 2 as illustrated in FIG. 1 and the support castor locking mechanism 180 is released where the bed 2 is equipped with a locking castor wheel 21. The bed mover 2 may now transfer the bed 4 to another location. To disengage the mover 2 from a bed 4, the aforementioned method is reversed.

b. Second, Third, Fourth & Fifth Embodiments of the Hospital Bed Transfer System FIG. 24 shows a top plan view, and FIG. 25 shows a side elevation view, of an electrically powered hospital bed moving machine 410 according to a second embodiment of the present invention. Similarly, FIG. 26 shows a top plan view, and FIG. 27 shows a side elevation view, of the hospital bed moving machine 410 according to a third embodiment of the present invention. As shown in FIGS. 24-27, the hospital bed moving machine 410 includes a body 412, a handle 414, and a hitch 416. The body 412 comprises a cover 418 and a structure 420. In one embodiment of the invention, the body 412 does not have a cover 418, but simply comprises a structure 420.

Figure 28:
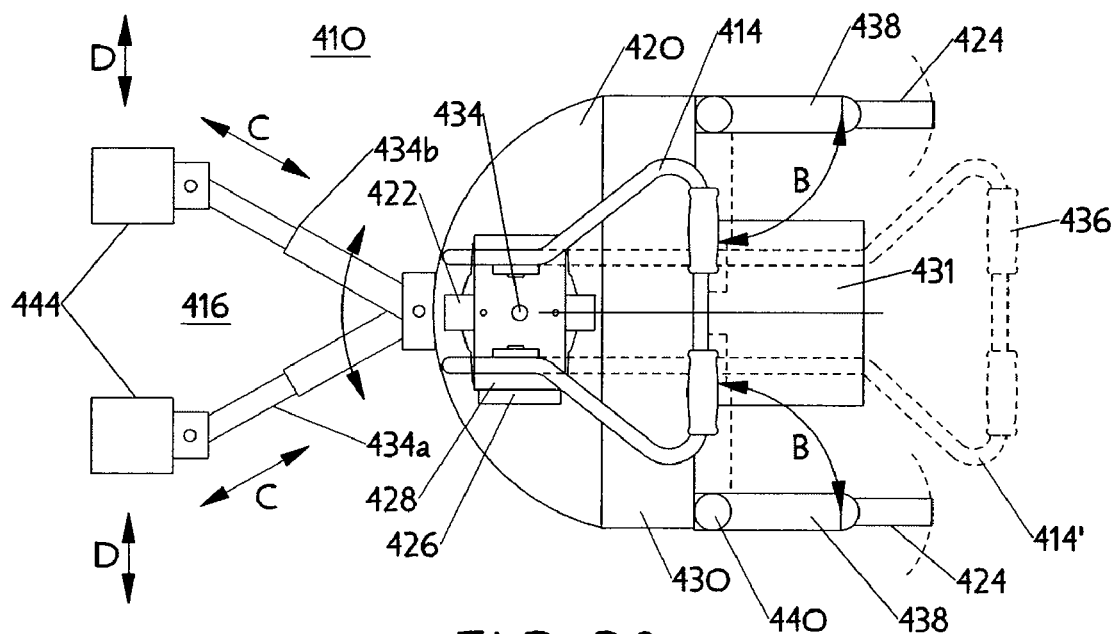
FIG. 28 is a top plan view of the power-assist machine with the cover removed, according to a fourth embodiment of the present invention.
Figure 29:
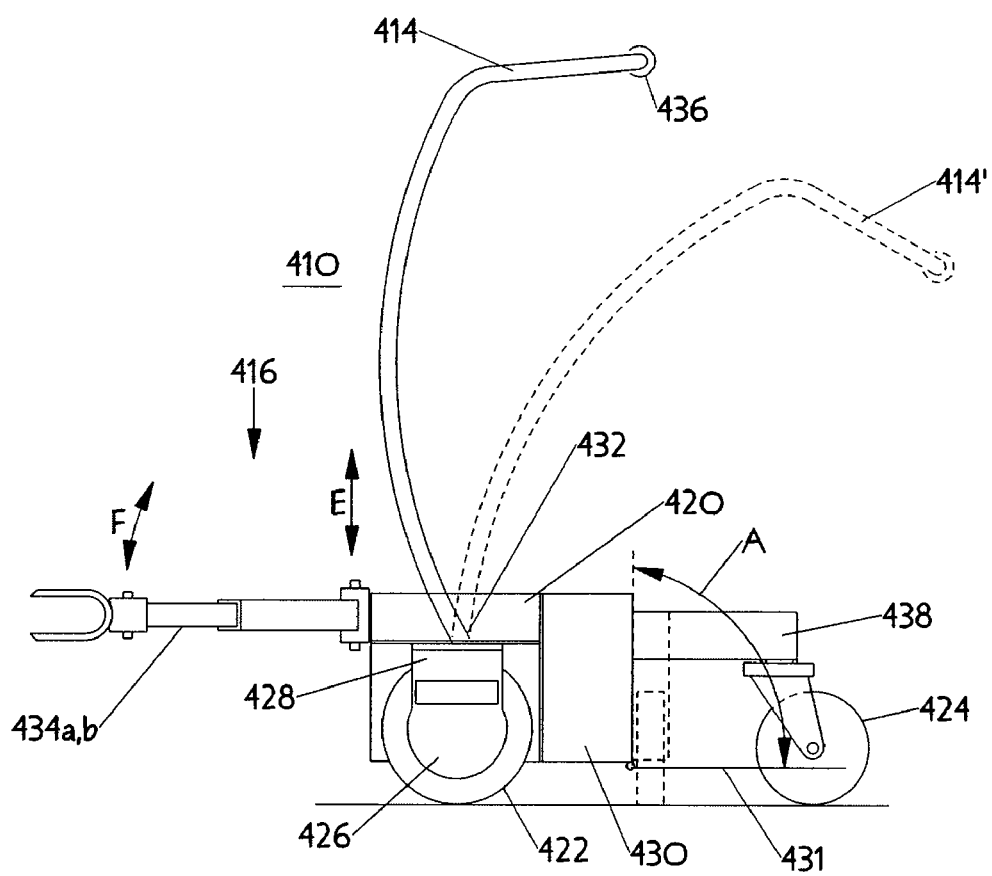
FIG. 29 is a side elevation view of the power-assist machine shown in FIG. 28 with the cover removed.

FIGS. 28 and 29 show, respectively, top plan and side elevation views of a third embodiment of the invention with the cover 418 removed. As can be understood from FIGS. 24-29, the cover 418 houses the structure 420, the drive wheel 422, the free turning wheels 424, the motor 426, the motor controls (i.e., drive circuitry) 428, and the power source 430.

As can be understood from FIGS. 24-29, the body 412 couples to the handle 414 and the hitch 416. As best shown in FIGS. 24 and 26, the body 412 has a wide stance and a low center of gravity to enhance the stability of the machine 410. This stability is advantageous in that it helps the machine 410 to propel the hospital bed, which has a weight of up to 2000 pounds or more. The cover 418 of the body 412 acts to shield the operator or mover from internal components, and it provides a surface to display warnings or directions to the operator.

As shown in FIGS. 28 and 29, in one embodiment of the invention, the machine 410 has a standing platform 431 on which an operator may ride. The standing platform 431 further increases the ease by which an operator may move a hospital bed. The standing platform 431 also allows the operator's weight to be transferred to the drive wheel 422 of the machine 410, thereby increasing traction for the drive wheel 422 or wheels. The standing platform 431 may fold up or down as indicated by arrows "A" in FIG. 29.

The handle 414 is moveably coupled to the body 412, such that the handle 414 can rotate about a horizontal pivot 432 to a lowered position (shown as 414' in FIGS. 25, 27 and 29). In another embodiment, the handle 414 has a single position in that it does not rotate about a horizontal pivot 432. In one embodiment, the handle 414 is also coupled to the drive wheel 422 and the operator of the machine 410 can rotate the drive wheel 422 by rotating the handle 414 about a vertical pivot 434 (see FIG. 28), using a tiller control. In one embodiment of the present invention, user or mover controls 436 are placed near a distal end of the handle 414. In other embodiments of the invention, the controls 436 are located at other points on the handle 414 or machine 410. The controls 436 are adapted to be manipulated by the mover to control speed and direction of the machine 410, or any other necessary control parameter. In one embodiment of the present invention, the controls 436 are as available from Elektrosistem as distributed in the United States by AGV Products, Inc., 8012 Tower Point Dr., Charlotte, N.C. 28227.

Referring to FIGS. 28 and 29, in one embodiment, the power source 430 housed within the body 412 is one or more direct current batteries to provide electrical power to the electric motor 426. In another embodiment, the power source 430 further includes a battery charger to provide a method to re-energize the batteries. The battery charger may be on the machine 410 or at a recharge station. In one embodiment, the power source 430 includes a transformer and can receive alternating current from an external source through an electrical cord. The power source 430 powers the electric motor 426, which drives the drive wheel 422 or wheels to move the machine 410 and bed.

In one embodiment, the machine 410 includes a brake to limit motion of the machine 410 and bed, when not moving under the operator's control. In one embodiment, brake operation is activated when the electric motor is not in forward or reverse. The brake may be electrical or mechanical in nature. A separate control to release the brake may be provided. In one embodiment, the machine 410 includes a regenerative or dynamic braking feature to prevent the machine from overly accelerating as it travels down an incline. In one embodiment, the braking features are offered by controls 436 available through Elektrosistem as distributed in the United States by AGV Products, Inc., 8012 Tower Point Dr., Charlotte, N.C. 28227.

As discussed above, in one embodiment, the handle 414 has more than one operating position. The first position (shown as 414 in FIGS. 25, 27 and 29) is used when the operator is facing the machine 410. This position will most often be used when the machine 410 is attached to a bed and moving the bed. The handle 414 will be positioned close to the hitch 416 and bed and is designed to have the operator face the bed for good visibility of the bed and obstacles for clearance and for observation of the patient. In one embodiment, a second handle position (shown as 414' in FIGS. 25, 27 and 29) facilitates the machine in following the operator, although this second position can be used with the operator facing toward or away from the machine. The handle 414 will be positioned away from the hitch 416 and is designed for operator use with one hand while walking with his back to the machine 410. In this position, the machine 410 and bed (if attached) will follow the operator.

As previously noted, in one embodiment, the handle has a single position, the forward and backward motion of the machine 410 being controlled by controls 436 mounted on the distal end of the handle 414. In one embodiment of the invention, the handle 414 turns the drive wheel 422 via direct structural connection. In another embodiment, the handle 414 turns the drive wheel 422 via steering linkages or gears. In yet another embodiment, the handle 414 turns the drive wheel 422 via electrical controls connected to electromechanical devices.

As shown in FIGS. 28 and 29, in one embodiment, the present invention includes two free turning wheels 424 and one drive wheel 422. In this embodiment, the two free turning wheels 424 are located near the tips 437a, 437b of the body 412 (see FIGS. 24 and 27). The drive wheel 422 is located near the longitudinal centerline of the body 412, near the hitch 416. In one embodiment, the drive wheel 422 has a wide lateral dimension and is constructed from a soft, high-friction material, to maximize the frictional forces realized between the drive wheel 422 and the hospital floor. In one embodiment, the drive wheel 422, a gearbox, and the motor 426 form an integrated unit with the gearbox and the motor 426 being mounted on the hub of the drive wheel 422. The integrated unit of one embodiment of the invention is available from AGV Products, Inc., 8012 Tower Point Dr., Charlotte, N.C. 28227. In one embodiment, the motor 426 is separate from the drive wheel 422. Power is distributed from the motor 426 to the drive wheel 422 via mechanical means such as gears, shafts, belts and sheaves, or chains and sprockets.

Figure 30:
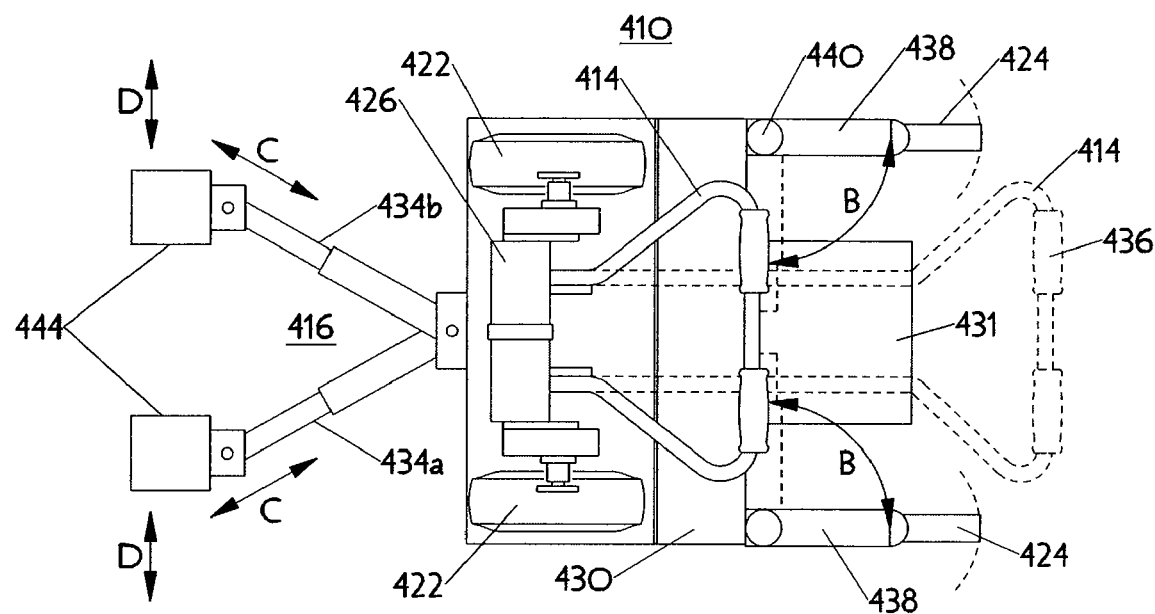
FIG. 30 is a top plan view of the power-assist machine with the cover removed according to a fifth embodiment of the present invention having two drive wheels.
Figure 31:
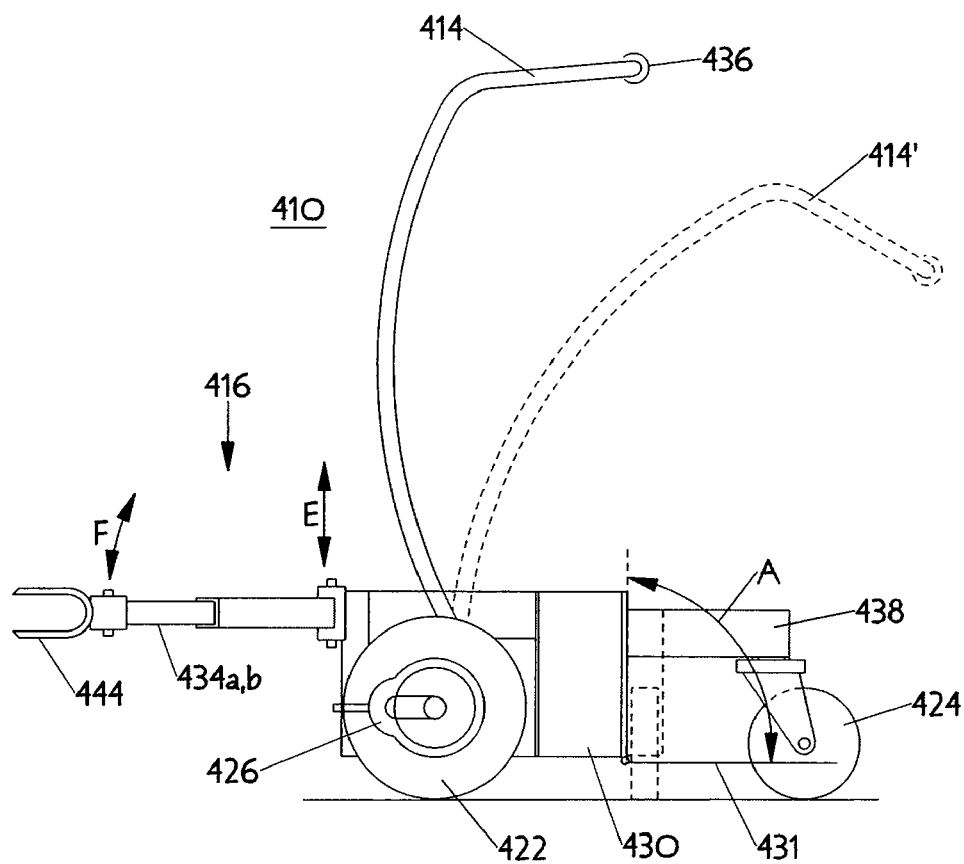
FIG. 31 is a side elevation view of the power-assist machine shown in FIG. 30 with the cover removed.

As shown in FIGS. 30 and 31, in a fourth embodiment of the present invention, a second drive wheel is employed. In this embodiment, each drive wheel 422 may have its own motor 426 or the same motor 426 may power both drive wheels 422. Likewise, each drive wheel 422 may be commonly or independently controlled. In other embodiments, other wheel configurations are employed to further stabilize the machine and bear weight.

As shown in FIGS. 28 and 30, in one embodiment of the invention, the each free turning wheel 424 is mounted on a folding arm 438, which is attached to the structure 420 by a hinge 440. When the machine 410 enters an elevator or is stored in a confined space, the folding arms 438 may be folded in against the body 412 of the machine 410 as indicated by arrows "B" in FIGS. 28 and 30.

In one embodiment, the machine 410 includes an electric motor controller (i.e., drive circuitry) 428 for controlling the current provided to the electric motor 426 from the power source 430, based on the input from the operator controls 436. The motor controller 428 provides efficient control of the electric motor 426 to drive the drive wheel 422 in forward and reverse directions. In one embodiment, the motor controller 428 operates the electric motor 426 to allow a speed of between 0.5 and 3 miles per hour. The motor controller 428 may also provide the electrical braking features mentioned above, including regenerative or dynamic braking. In one embodiment of the present invention, the motor controller 428 is a model 1225/35 or 1227/37 motor controller as manufactured by Curtis Instruments, Inc., 200 Kisco Avenue, Mt. Kisco, N.Y. 10549.

As shown in FIGS. 24-29, the hitch 416, in one embodiment, comprises two telescoping arms 434a, 434b. Each telescoping arm 434a, 434b terminates in a securing device such as a clamp 444, as indicated in FIGS. 24-29. The hitch 416, via such securing devices as clamps 444, operates to engage the frame of the hospital bed, to connect the hospital bed moving machine 410 to the hospital bed without tools and with little physical effort. In one embodiment of the invention, the hitch 416 connects to the bed and transfers the bed's weight to the drive wheel 422 of the machine 410. This transfer of weight acts to increase the frictional force between the drive wheel 422 of the machine 410 and the hospital floor.

As shown in FIGS. 24, 26 and 28, the telescoping arms 434a, 434b of the hitch 416 may extend/retract and may converge/diverge as indicated by arrows "C" and "D," respectively. As shown in FIGS. 25, 27 and 29, the telescoping arms 434a, 434b may tilt up/down and may translate up/down as indicated by arrows "E" and "F," respectively. In one embodiment of the invention, the hitch 416 and the securing devices, such as clamps 444, are automated to facilitate and speed attachment. Electromechanical actuators, as are known in the art, cause the telescoping arms to move as described. In one embodiment of the invention, the hitch 416 and its telescoping arms 434a, 434b and securing devices are actuated automatically by the controls 436 on the handle 414.

Figure 32:
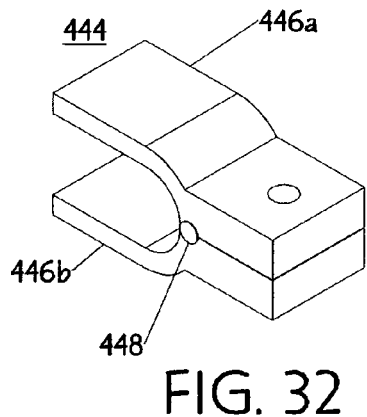
FIG. 32 is an embodiment of a securing device called a clamp.

One embodiment of a securing device is the clamp 444 illustrated in FIG. 32. A clamp 444 mechanically attaches to the end of each telescoping arm 434a, 434b as shown in FIGS. 24-29. Each clamp 444 has jaws 446a, 446b and a fulcrum 448. Electromechanical actuators cause the jaws 446a, 446b to pivot about the fulcrum 448 to clamp onto the hospital bed when the bed is to be transported and to release when the bed is disconnected from the machine 410 after the bed has arrived at its destination. While the clamp 444 is depicted in FIG. 32 as being configured to clamp on the horizontal structural member of a hospital bed, those skilled in the art will recognize that the clamp 444 can be configured to attach to a vertical structural member or a structural member of any other orientation.

Figure 33:
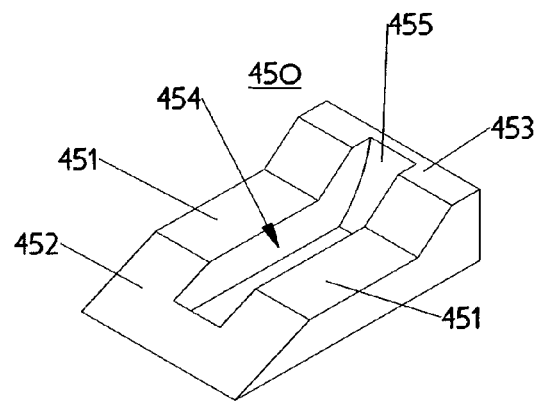
FIG. 33 is an embodiment of a securing device called a wheel lock.

One embodiment of a securing device is a wheel lock 450 as shown in FIG. 33. The wheel lock 450 comprises a block having a bed wheel entry end or sloped approach 452, a wheel groove 454, first and second sides 451, a back 453, and a curved portion 455 for contacting at least a portion of the bed wheel's rolling surface. The wheel lock 450 mechanically attaches to the end of a telescoping arm 434a, 434b. The wheel locks 450 are placed in front of hospital bed wheels, which travel up the sloped approaches 452 and fall into the wheel grooves 454 between the sides 451. The telescoping arms 434a, 434b then raise their respective wheel locks 450, the hospital bed wheels remaining nested within the wheel grooves 454 as the hospital bed is transported. To release the hospital bed, the wheel locks 450 are lowered back to the floor and the hospital bed wheels are rolled out of the wheel grooves 454 and down the sloped approaches 452 to the floor.

Figure 34:
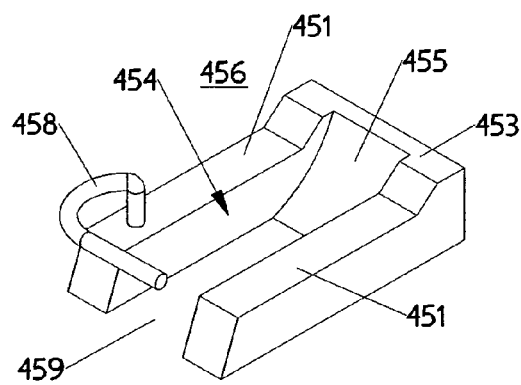
FIG. 34 is an embodiment of a securing device called a gated wheel lock.

One embodiment of a securing device is a gated wheel lock 456 as shown in FIG. 34. The gated wheel lock comprises a block having an open or wheel entry end 459, a wheel groove 454, a gate retainer 458 for obstructing the open or wheel entry end 459, first and second sides 451, a back 453, and a curved portion 455 for contacting at least a portion of the bed wheel's rolling surface. The gated wheel lock 456 mechanically attaches to the end of a telescoping arm 434a, 434b. The gated wheel locks 456 are placed in front of hospital bed wheels, which travel into the wheel grooves 454 via the open or wheel entry end 459. The gate retainers 458 are secured over the wheel entry or open end 459 of the wheel grooves 454, trapping the hospital bed wheels in the wheel grooves 454. The telescoping arms 434a, 434b then raise their respective gated wheel locks 456, the hospital bed wheels remaining nested within the wheel grooves 454 as the hospital bed is transported. To release the hospital bed, the gated wheel locks 454 are lowered back to the floor. The gate retainers 458 are opened and the hospital bed wheels are rolled out of the wheel grooves 454.

Figure 35:
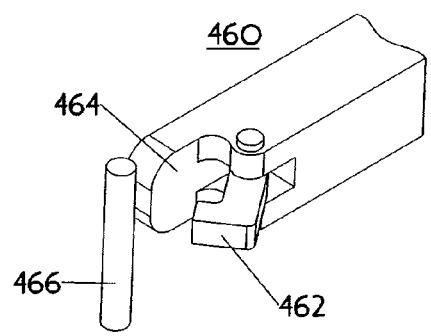
FIG. 35 is an embodiment of a securing device called a single-jaw clamp.

One embodiment of a securing device is a single-jaw clamp 460 as shown in FIG. 35. The single-jaw clamp 460 comprises a rotating jaw 462 and a back 464. The single-jaw clamp 460 mechanically attaches to the end of a telescoping arm 434a, 434b. The single-jaw clamp 460, with its rotating jaw 462 in the fully open position, is placed adjacent to a structural member 466 on the hospital bed. The structural member 466 is placed between the rotating jaw 462 and the back 464. Electromechanical actuators cause the rotating jaw 462 to close, securing the structural member 466 between the rotating jaw 462 and the back 464. The telescoping arms 434a, 434b then raise their respective single jaw clamps 460 to place the hospital bed in transport position. Once the hospital bed has been transported to its destination, the process is reversed to release the bed. While the single-jaw clamp 460 is depicted approaching a vertical structural member 466, those skilled in the art will recognize that the single-jaw clamp 460 can be configured to attach to a horizontal structural member or a structural member of any other orientation.

Figure 36:
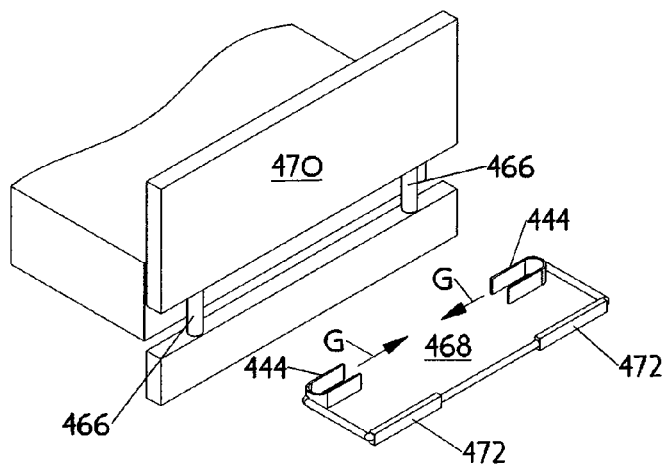
FIG. 36 is an embodiment of a securing device called a slide yoke.

One embodiment of a securing device is a slide yoke 468 as shown in FIG. 36. The slide yoke 468 utilizes opposing clamps 444 as illustrated in FIG. 32. The slide yoke 468 mechanically attaches to the end of the telescoping arms 434a, 434b. Once the clamps 444 of the slide yoke 468 are positioned so that the vertical structures 466 of a hospital bed 470 are between the opposing clamps 444, the slide yoke arms 472 converge the clamps 444 together (as indicated by arrows "G" in FIG. 36) until each structure 466 enters its respective clamp 444. Once the structures 466 are located within the confines of the clamps 444, the clamps close on the structures 466 and the telescoping arms 434a, 434b raise the hospital bed 470 for transport. Once the hospital bed 470 has been transported to its destination, the process is reversed to release the bed.

Alternate hitches 416 may be required for some beds. For example, the hitch 416 may be longer or shorter than depicted in the various Figures of this specification. Also, the hitch 416 may attach to the body 412 at locations other than those depicted in the Figures. Furthermore, the hitch 416 may be configured so that it does not have telescoping arms but is simply a groove or other type of hospital bed structure receiving device mounted on the body 12 of the machine 410 that allows the machine 410 to attach to a hospital bed for transportation. In other words, the hitch 416 may be any structure mounted on or that is part of the body 412 that allows the hospital bed to be attached to the machine 410 for transporting of the bed by the machine 410.

Figure 37:
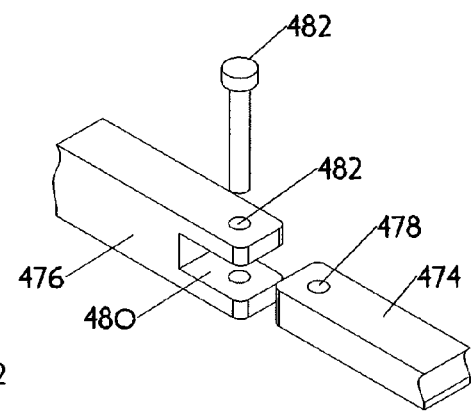
FIG. 37 is an embodiment of an attachment device having a tongue and a tongue-receiving element.

Also, some beds may require an attachment to allow connection of the hitch 416. An example of one embodiment of an attachment is shown in FIG. 37. FIG. 37 shows a tongue 474 and a tongue-receiving element 476. The tongue 474 has a first pin-receiving hole 478 and the tongue-receiving element 476 has a tongue receiving slot 480 and a second pin-receiving hole 482. The tongue 474 is placed within the tongue receiving slot 480 and the two pinholes 478, 482 are aligned. A pin 484 is placed within the aligned pinholes 478, 482, securing the tongue 474 to the tongue-receiving element 476. In one embodiment of the invention, the tongue 474 will be an attachment temporarily or permanently mounted on a hospital bed frame and the tongue-receiving element 476 will be secured to the end of the telescoping arms 434a, 434b of the hitch 416. In another embodiment of the invention, the tongue 474 will be located on the telescoping arms 434a, 434b of the hitch 416 and the tongue-receiving element 476 will be temporarily or permanently mounted on a hospital bed frame.

During operation of the machine 410, the operator uses the forward, reverse, and steering hand controls 436 on the handle 414 to activate the electric motor controller 428, electric motor 426, and drive wheel 422 or wheels to move the machine 410 into position from its at rest or storage position next to the hospital bed and close enough to allow hitching to the bed. The free turning wheels 424 provide support and balance for the machine 410 during this and all other operations. Next, the operator causes the hitch 416 to connect the machine 410 to the bed by manually moving the parts of the hitch 416 and latching them to the bed. In one embodiment, the operation of the hitch 416 may be electrically moved and latched and may be automated to ease and speed the attachment. In one embodiment, telescoping arms 434a, 434b extend forward until they contact the frame of the hospital bed. The arms 434a, 434b then spread out to position the securing devices, such as clamps 444, at equal distances from the center of hospital bed. The securing devices, such as clamps 444, then engage the frame of the hospital bed.

Next, the operator uses the forward, reverse, and steering hand controls 436 on the handle 414 to move the machine 410 and bed from its current location to a different location. During the moving of the machine 410 and bed, the handle 414 may be in the facing or following positions depending upon whether the operator is leading the machine and bed or whether the bed is leading the machine 410 and operator. During this move, the operator can turn the bed by turning the handle 414 about a vertical pivot point 434, which in turn causes the drive wheel 422 to turn.

Next, the operator causes unhitching to disconnect the machine 410 from the bed by manually moving the parts of the hitch 416 and unlatching them from the bed. In another embodiment, the hitch 416 is electrically moved and unlatched and may be automated to ease and speed the unhitching.

While the first embodiment (depicted in FIGS. 1-23) is shown with horizontally displaceable jaws 26, those skilled in the art will understand that the first embodiment may be configured to employ any one or more of the engagement features illustrated in FIGS. 32-37. Also, those skilled in art will understand that many of the features of the first embodiment (depicted in FIGS. 1-23) may be employed with the second through fifth embodiments (depicted in FIGS. 24-31), including the emergency bed release lever system 25 (FIG. 4), the locking mechanism 180 (FIGS. 15-19), the contact switch systems 78, 84 (FIGS. 6 and 7), the control or operational sequences, etc.

Although various embodiments of this invention have been described above with a certain degree of particularity or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A machine for moving a bed, the machine comprising:
    a bed engagement portion comprising a pair of horizontally oriented jaws that extend forwardly from the front of the engagement portion; and
    a base portion supporting the bed engagement portion and comprising a drive wheel, a support wheel, and a locking mechanism, wherein the support wheel is pivotal about a vertical axis, wherein the locking mechanism electrically actuates between a locked position that prevents the support wheel from pivotally displacing about the vertical axis and an unlocked position that allows the support wheel to pivotally displace about the vertical axis.

2. The machine of claim 1, further comprising a contact switch adapted to indicate engagement with the bed.

3. The machine of claim 2, wherein the contact switch is part of the bed engagement portion.

4. The machine of claim 2, further comprising an electrical power source adapted to cause the bed engagement portion to engage or disengage the bed.

5. The machine of claim 4, further comprising an emergency release adapted to disengage the bed engagement portion from the bed when the electrical power source is unable to disengage the bed engagement portion from the bed, wherein the emergency release horizontally displaces the pair of horizontally oriented jaws to disengage the pair of horizontally oriented jaws from the bed.

6. The machine of claim 5, further comprising an elevator mechanism adapted to change the elevation of the bed engagement portion relative to the base portion so as to adjust the height of the bed engagement portion to the height of an attachment element.

7. A machine for moving a bed, the machine comprising:
    a bed engagement portion;
    a base portion supporting the bed engagement portion and comprising a drive wheel, a support wheel, and a locking mechanism, wherein the support wheel is pivotal about a vertical axis, wherein the locking mechanism actuates between a locked position that prevents the support wheel from pivotally displacing about the vertical axis and an unlocked position that allows the support wheel to pivotally displace about the vertical axis; and
    a contact switch adapted to indicate engagement with the bed wherein the actuation of the contact switch results in the locking mechanism actuating to the unlocked position.

8. A machine for moving a bed, the machine comprising:
    a bed engagement portion;
    a base portion supporting the bed engagement portion and comprising a drive wheel;
    a first contact switch adapted to indicate engagement of the bed engagement portion with the bed; and
    a second contact switch adapted to indicate proper elevation of the bed engagement portion relative to the bed.

9. A machine for moving a bed, the machine comprising:
    a bed engagement portion; and
    a base portion supporting the bed engagement portion and comprising a drive wheel assembly and a housing, wherein the drive wheel assembly is pivotal about a vertical axis and generally resides within the housing, wherein the housing includes a hinged portion that is caused to pivot when encountered by a portion of the drive wheel assembly when the drive wheel assembly is pivotally displaced about the vertical axis.

10. The machine of claim 9, wherein a footprint area of the base portion is smaller when the drive wheel assembly does not contact the hinged portion than when the drive wheel assembly does contact the hinged portion.

11. A machine for moving a bed, the machine comprising:
    a vertically disposed bed engagement portion with a housing comprising a top surface and a back surface;
    a base portion supporting the bed engagement portion and comprising a drive wheel; and a control panel comprising
- a horizontal surface generally flush with the top surface of the housing;
- a vertical surface generally flush with the back surface of the housing; and
- at least one control mounted on the control panel, wherein the control panel is pivotal relative to the housing so as to project beyond the back surface of the housing when pivoted.

12. The machine of claim 11, wherein the control panel is pivotal between an up position and a down position.

13. The machine of claim 12, wherein a footprint area of the machine is smaller when the control panel is in the up position.

14. The machine of claim 11, wherein the at least one control is a direction control.

* * * * *